US012812730B2

(12) United States Patent
Lee et al.

(10) Patent No.: US 12,812,730 B2
(45) Date of Patent: Nov. 24, 2026

(54) METHOD AND APPARATUS FOR TRANSMISSION AND RECEPTION OF NETWORK-CONTROLLED REPEATER FOR WIRELESS COMMUNICATION SYSTEMS

(71) Applicant: Samsung Electronics Co., Ltd., Suwon-si (KR)

(72) Inventors: Kyunggyu Lee, Suwon-si (KR); Kyungjun Choi, Suwon-si (KR); Yeongeun Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 18/318,359

(22) Filed: May 16, 2023

(65) Prior Publication Data

US 2023/0371123 A1 Nov. 16, 2023

(30) Foreign Application Priority Data

May 16, 2022 (KR) ........................ 10-2022-0059775

(51) Int. Cl.
*H04W 76/38* (2018.01)
*H04L 1/08* (2006.01)
(Continued)

(52) U.S. Cl.
CPC ............... *H04W 76/38* (2018.02); *H04L 1/08* (2013.01); *H04L 1/1812* (2013.01); *H04W 72/1268* (2013.01); *H04W 72/21* (2023.01)

(58) Field of Classification Search
CPC . H04W 76/38; H04W 72/1268; H04W 72/21; H04L 1/08; H04L 1/1812;
(Continued)

(56) References Cited

U.S. PATENT DOCUMENTS 12,519,571 B2 * 1/2026 Kim ...................... H04L 1/1812
2019/0123861 A1 * 4/2019 Liu ................... H04W 72/0446
(Continued)

FOREIGN PATENT DOCUMENTS

ID P202404290 A * 6/2024
WO WO-2020227103 A1 * 11/2020 ............ H04W 72/23
WO WO-2021022439 A1 * 2/2021 ........... H04L 1/1854

OTHER PUBLICATIONS

International Search Report dated Aug. 8, 2023, issued in International Patent Application No. PCT/KR2023/006610.
(Continued)

*Primary Examiner* — Mohammad S Adhami
*Assistant Examiner* — Samuel Dilan Rutnam
(74) *Attorney, Agent, or Firm* — Jefferson IP Law, LLP

(57) ABSTRACT

A method performed by a network controlled repeater (NCR) in a wireless communication system is provided. The method includes receiving, from a base station, control information including information associated with a cancellation and a retransmission of an uplink transmission of the NCR, identifying a first time duration for the cancellation of the uplink transmission based on the control information, canceling the uplink transmission within the first time duration, identifying a second time duration for the retransmission of the uplink transmission which is canceled within the first time duration, and performing the retransmission of the uplink transmission based on the second time duration.

19 Claims, 20 Drawing Sheets

(51) Int. Cl.
*H04L 1/1812* (2023.01)
*H04W 72/1268* (2023.01)
*H04W 72/21* (2023.01)

(58) Field of Classification Search
CPC ... H04L 1/1671; H04L 1/1896; H04L 1/1854; H04B 7/15542; H04B 7/15507; H04B 7/15535
See application file for complete search history.

(56) References Cited

U.S. PATENT DOCUMENTS

| | | | | |
|---|---|---|---|---|
| 2021/0076453 | A1* | 3/2021 | Luo | H04W 76/36 |
| 2021/0235476 | A1 | 7/2021 | Luo et al. | |
| 2021/0368360 | A1 | 11/2021 | Akl et al. | |
| 2022/0053433 | A1 | 2/2022 | Abedini et al. | |

OTHER PUBLICATIONS

ZTE Corporation, "New SI: Study on NR Network-controlled Repeaters", 3GPP TSG RAN Meeting #94e, RP-213700, Dec. 6-17, 2021.
3rd Generation Partnership Project; Technical Specification Group Radio Access Network; NR; Physical layer procedures for control (Release 16), 3GPP TS 38.213 V16.9.0, Mar. 2022.
Extended European Search Report dated Jun. 11, 2025, issued in European Patent Application No. 23807874.5.

* cited by examiner

METHOD AND APPARATUS FOR TRANSMISSION AND RECEPTION OF NETWORK-CONTROLLED REPEATER FOR WIRELESS COMMUNICATION SYSTEMS

CROSS-REFERENCE TO RELATED APPLICATION(S)

This application is based on and claims priority under 35 U.S.C. § 119(a) of a Korean patent application number 10-2022-0059775, filed on May 16, 2022, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for transmission and reception of a network controlled repeater for a wireless communication system.

2. Description of Related Art

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for performing uplink or downlink communication through a repeater between a base station and a terminal in a wireless communication system.

Additional aspects will be set forth in part in the description which follows and, in part, will be apparent from the description, or may be learned by practice of the presented embodiments.

In accordance with an aspect of the disclosure, a method performed by a network controlled repeater (NCR) in a wireless communication system is provided. The method includes receiving, from a base station, control information including information associated with a cancellation and a retransmission of an uplink transmission of the NCR, identifying a first time duration for the cancellation of the uplink transmission based on the control information, canceling the uplink transmission within the first time duration, identifying a second time duration for the retransmission of the uplink transmission which is canceled within the first time duration, and performing the retransmission of the uplink transmission based on the second time duration.

In accordance with another aspect of the disclosure, a method performed by a base station in a wireless communication system is provided. The method includes transmitting, to a NCR, control information including information associated with a cancellation and a retransmission of an uplink transmission of the NCR, and receiving, from the NCR, an uplink signal based on a first time duration, wherein the uplink transmission of the NCR is canceled within a second time duration for the cancellation of the uplink transmission, the second time duration being identified based on the control information, and wherein the uplink signal corresponds to the retransmission of the uplink transmission which is canceled within the second time duration.

In accordance with another aspect of the disclosure, an NCR in a wireless communication system is provided. The NCR includes a transceiver, and a controller coupled with the transceiver and configured to receive, from a base station, control information including information associated with a cancellation and a retransmission of an uplink transmission of the NCR, identify a first time duration for the cancellation of the uplink transmission based on the control information, cancel the uplink transmission within the first time duration, identify a second time duration for the retransmission of the uplink transmission which is canceled within the first time duration, and perform the retransmission of the uplink transmission based on the second time duration.

In accordance with another aspect of the disclosure, a base station in a wireless communication system is provided. The base station includes a transceiver, and a controller coupled with the transceiver and configured to transmit, to a NCR, control information including information associated with a cancellation and a retransmission of an uplink transmission of the NCR, and receive, from the NCR, an uplink signal based on a first time duration, wherein the uplink transmission of the NCR is canceled within a second time duration for the cancellation of the uplink transmission, the second time duration being identified based on the control information, and wherein the uplink signal corresponds to the retransmission of the uplink transmission which is canceled within the second time duration.

The technical problems to be achieved in the embodiment of the disclosure are not limited to the technical problems mentioned above, and other technical problems not mentioned herein will be clearly understood from the following description by those skilled in the art to which the disclosure belongs.

According to an embodiment of the disclosure, a repeater that is under the control of a base station can amplify and transmit an uplink signal transmitted from the terminal to the base station through the repeater and perform a transmission of an uplink signal transmitted by the repeater to the base station through time multiplexing in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
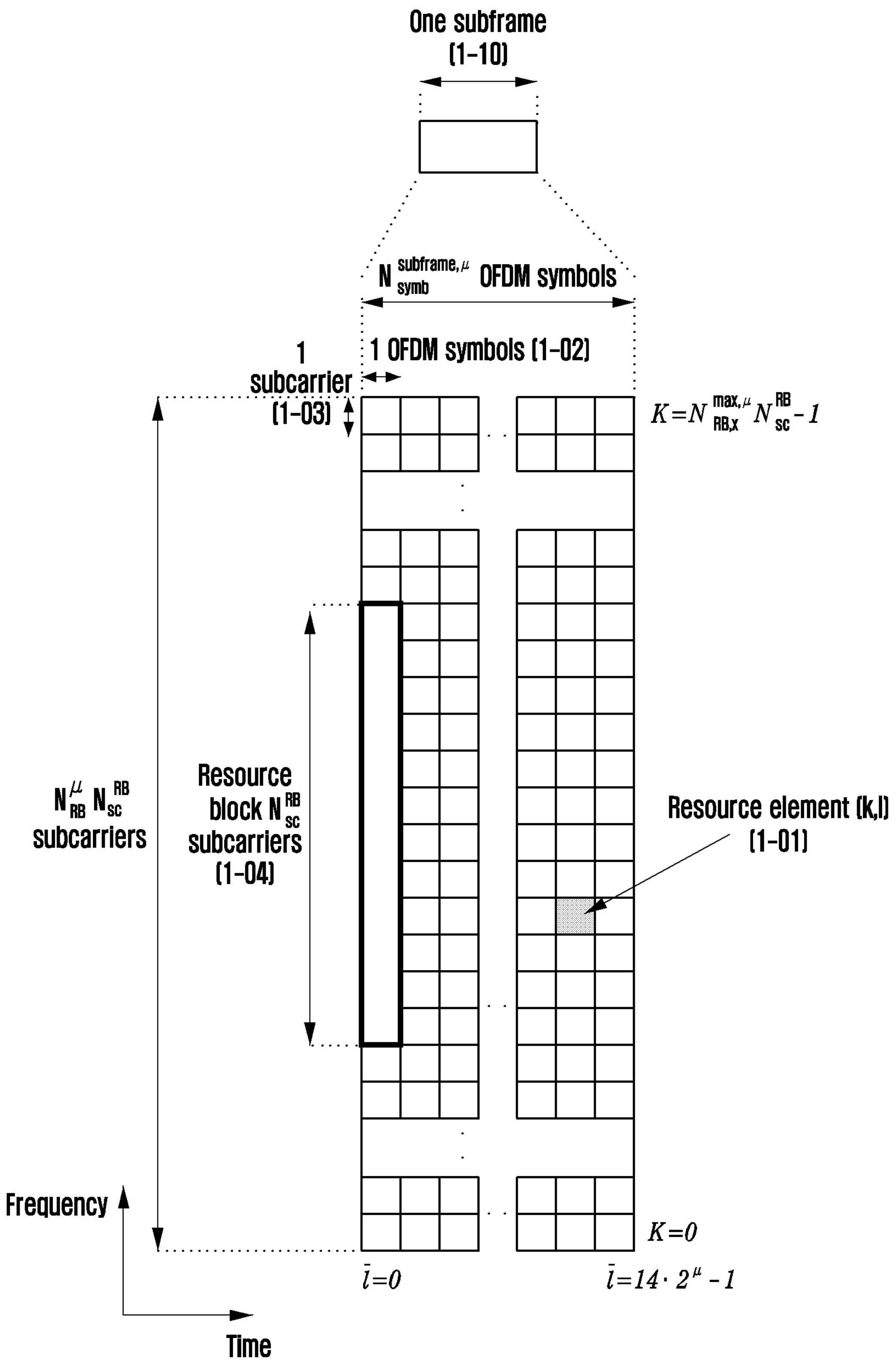
FIG. 1 illustrates a basic structure of a time-frequency resource of a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

Hereinafter, the operation principle of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a next-generation node B (gNode B), an evolved Node B (eNode B), a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to technology for receiving broadcast information from a base station by a terminal in a wireless communication system. The disclosure relates to a communication technique for converging IoT technology with a 5th generation (5G) communication system designed to support a higher data transfer rate beyond the 4th generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms related to communication coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3$^{rd}$ generation partnership project long term evolution (3GPP LTE) standards may be used for the convenience of description. However, the disclosure is not limited by these terms and names, and may be applied in the same way to systems that conform other standards.

Wireless communication systems have been developed from wireless communication systems providing voice centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, 802.16e of institute of electrical and electronics engineers (IEEE), and the like.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (BS or eNodeB), and the DL refers to a wireless link through which a base station transmits data or a control signal to a terminal. The multiple access scheme normally allocates and operates time-frequency resources for transmission of data or control information according to each user so as to prevent the time-frequency resources from overlapping with each other, that is, to establish orthogonality, thereby distinguishing the data or the control information of each user.

As a future communication system after LTE, that is, a 5G communication system has to be able to freely reflect various requirements of a user and a service provider, and thus services satisfying various requirements need to be supported. The services considered for the 5G communication system include enhanced mobile broadband (eMBB), massive machine-type communication (mMTC), ultra-reliability low latency communication (URLLC), and the like.

According to some embodiments, eMBB aims to provide a higher data transmission rate than a data transmission rate supported by the LTE, LTE-A, or LTE-Pro. For example, in the 5G communication system, eMBB should be able to provide a peak data rate of 20 Gbps in the DL and a peak data rate of 10 Gbps in the UL from the viewpoint of one base station. At the same time, the 5G communication system should provide the increased user perceived data rate of the terminal. In order to satisfy such requirements, improvement of various transmitting/receiving technologies including a further improved multiple input multiple output (MIMO) transmission technology is needed. In addition, the 5G communication system uses a bandwidth wider than 20 megahertz (MHz) in a frequency band of 3 to 6 GHz or more than 6 GHz, instead of a 2 GHz band used by the current LTE, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and devices to provide communication functions. In addition, because the terminals supporting mMTC are more likely to be positioned in shaded areas not covered by a cell, such as a basement of a building due to nature of services, the terminals may require a wider coverage than other services provided by the 5G communication system. The terminals supporting mMTC should be configured as inexpensive terminals and require very long battery life-time because it is difficult to frequently replace batteries of the terminals.

Finally, URLLC is a cellular-based wireless communication service used for mission-critical purposes, and the URLLC may consider a service used in remote control for robots or machinery, industrial automation, unmanned aerial vehicles, remote health care, emergency alerts, and the like. Accordingly, the URLLC should provide very low latency and very high reliability. For example, URLLC-supportive services need to meet an air interface latency of less than 0.5 milliseconds and simultaneously include requirements of a packet error rate of $10^{-5}$ or less. Accordingly, for URLLC-supportive services, the 5G system should provide a transmit time interval (TTI) shorter than those for other services while securing design requirements for allocating a broad resource in a frequency band. However, the aforementioned mMTC, URLLC, and eMBB are only examples of different service types, and the service types to which the disclosure is applied are not limited to the above-described examples.

The above-discussed services considered in the 5G communication system should be converged with each other and provided, based on a single framework. That is, for an effective resource management and control, it is desirable that such services are controlled and transmitted by being integrated into one system rather than being operated independently.

In addition, although an embodiment of the disclosure will be described below using an LTE, LTE-A, LTE Pro, or NR system as an example, the embodiment of the disclosure may be applied to other communication systems having similar technical backgrounds or channel types. In addition, an embodiments of the disclosure may be applied to other communication systems through some modifications within a range which does not significantly depart from the scope of the disclosure, as determined by a person having skilled technical knowledge.

5G System Frame Structure

Hereinafter, the frame structure of a 5G system will be described in more detail with reference to the drawings.

FIG. 1 illustrates the basic structure of a time-frequency resource of a wireless communication system according to an embodiment of the disclosure.

Referring to FIG. 1, the horizontal axis represents a time domain, and the vertical axis represents a frequency domain. A basic unit of resources in the time-frequency domain may be a resource element (RE) 1-01. The resource element 1-01 may be defined by 1 orthogonal frequency division multiplexing (OFDM) symbol 1-02 in time axis and 1 subcarrier 1-03 in frequency axis. In the frequency domain, $$N_{sc}^{RB}$$

(for example, 12) consecutive Res may configure one resource block (RB) 1-04. In an embodiment, a plurality of OFDM symbols may configure one subframe 1-10.

Figure 2:
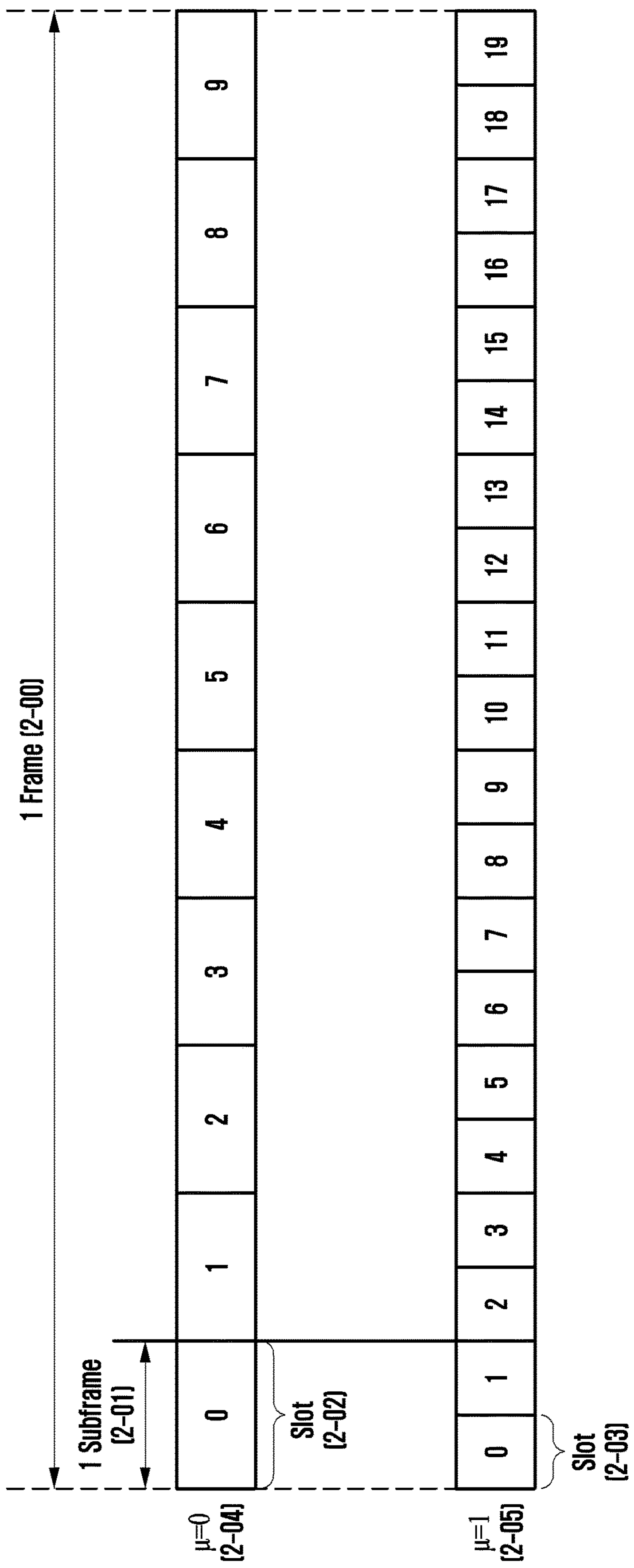
FIG. 2 illustrates a frame, subframe, and slot structure of a wireless communication system according to an embodiment of the disclosure.

FIG. 2 illustrates a frame, a subframe, and a slot structure in a wireless communication system according to an embodiment of the disclosure.

Referring to FIG. 2, one frame 2-00 may be configured by one or more subframes 2-01, and one subframe may include one or more slots 2-02. For example, 1 frame 2-00 may be defined as 10 millisecond (ms). 1 subframe 2-01 may be defined as 1 ms, and here 1 frame 2-00 may be configured by a total of 10 subframes 2-01. 1 slot 2-02 or 2-03 may be defined as 14 OFDM symbols (i.e., the number of symbols per slot ( $$(N_{symb}^{slot}) = 14)).$$

1 subframe 2-01 may be configured by one or multiple slots 2-02 and 2-03, and the number of slots 2-02 and 2-03 per 1 subframe 2-01 may differ according to configuration value μ 2-04 or 2-05 for a subcarrier spacing. In the example of FIG. 2, a case in which the subcarrier spacing configuration value is μ=0 (indicated by reference numeral 2-04) and μ=1 (indicated by reference numeral 2-05) is illustrated. In a case of μ=0 (indicated by reference numeral 2-04), 1 subframe 2-01 may include 1 slot 2-02, and in a case of μ=1 (indicated by reference numeral 2-05), 1 subframe 2-01 may include two slots 2-03. That is, the number of slots per subframe $$(N_{slot}^{subframe,\mu})$$

may differ according to a subcarrier spacing configuration value μ, and accordingly, the number of slots per frame $$(N_{slot}^{frame,\mu})$$

may differ. According to each subcarrier spacing configuration $$\mu,\ N_{slot}^{subframe,\mu} \text{ and } N_{slot}^{frame,\mu}$$

may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs or more. Therefore, when a UE always receives the entire serving cell bandwidth, such as in the LTE system, power consumption of the UE may be extreme, and in order to solve this problem, it is possible for a base station to configure one or more bandwidth parts (BWPs) for the UE so as to support the UE to change a reception area within a cell. In NR, the base station may configure an "initial BWP", which is a bandwidth of CORESET #0 (or common search space (CSS)), for the UE via a master information block (MIB). Thereafter, the base station may configure an initial BWP (first BWP) of the UE via radio resource control (RRC) signaling, and may notify of at least one BWP configuration information that can be indicated through downlink control information (DCI) in the future. Thereafter, the base station may notify of a BWP ID via DCI so as to indicate which band the UE is to use. If the UE fails to receive DCI in a currently allocated BWP for a specific period of time or more, the UE returns to a "default bandwidth part" and attempts to receive DCI.

5G Bandwidth Part

Figure 3:
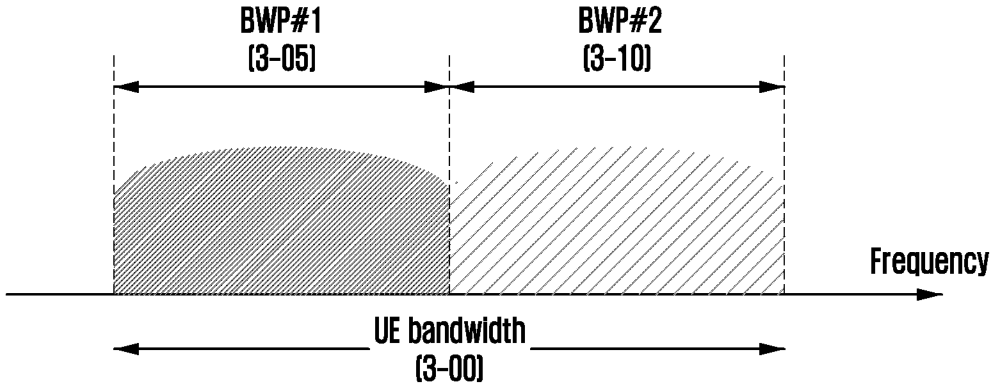
FIG. 3 illustrates an example of a bandwidth part (BWP) configuration in a wireless communication system according to an embodiment of the disclosure.

FIG. 3 illustrates an example of a bandwidth part (BWP) configuration in a wireless communication system according to an embodiment of the disclosure.

Referring to FIG. 3, FIG. 3 illustrates an example in which a UE bandwidth 3-00 is configured by two BWPs, that is, BWP #1 3-05 and BWP #2 3-10. The base station may configure one or multiple BWPs for the UE, and may configure pieces of information as shown in Table 2 below for each bandwidth part.

TABLE 2

```
BWP ::=                          SEQUENCE {
  bwp-Id                             BWP-Id,
 (bandwidth part identifier)
  locationAndBandwidth              INTEGER (1..65536),
  (bandwidth part location)
  subcarrierSpacing                 ENUMERATED {n0, n1,
n2, n3, n4, n5},
```

TABLE 2-continued

| | |
|---|---|
| (subcarrier spacing) | |
| cyclicPrefix | ENUMERATED { extended |
| } | |
| (cyclic prefix) | |
| } | |

An embodiment of the disclosure is not limited to the above example, and in addition to the configuration information, various parameters related to a BWP may be configured in the UE. The above-described pieces of information may be transmitted by the base station to the UE via higher layer signaling, for example, RRC signaling. At least one BWP among the configured one or multiple BWPs may be activated. Whether to activate the configured BWP may be semi-statically transmitted from the base station to the UE via RRC signaling or may be dynamically transmitted through an MAC control element (CE) or DCI.

According to an embodiment, a UE before radio resource control (RRC) connection may be configured with an initial BWP for initial access from a base station through a master information block (MIB). More specifically, the UE may receive configuration information about a search apace and a control resource set (CORESET) through which the physical downlink control channel (PDCCH) can be transmitted, in order to receive system information required for initial access (which may correspond to remaining system information (RMSI) or system information block 1 (SIB 1)) through the MIB in an initial access operation. Each of the control resource set (CORESET) and search space configured through the MIB may be regarded as identity (ID) 0.

The base station may notify the UE of configuration information, such as frequency allocation information, time allocation information, and numerology for the control resource set #0 through the MIB. In addition, the base station may notify the UE of configuration information regarding the monitoring periodicity and occasion for the control resource set #0, that is, configuration information regarding the search space #0, through the MIB. The UE may regard the frequency domain configured as the control resource set #0, obtained from the MIB, as an initial BWP for initial access. Here, the identity (ID) of the initial BWP may be regarded as zero.

The configuration of the BWP supported by the above-described next-generation mobile communication system (5G or NR system) may be used for various purposes.

As an example, in case that a bandwidth supported by the UE is smaller than a system bandwidth, the bandwidth supported by the UE may be supported through the BWP configuration. For example, in Table 2, a frequency location (configuration information 2) of the BWP is configured for the UE and thus the UE may transmit or receive data at a specific frequency location within the system bandwidth.

According to another example, the base station may configure multiple BWPs in the UE for the purpose of supporting different numerologies. For example, in order to support both data transmission/reception to/from a predetermined UE by using a subcarrier spacing of 15 kilohertz (kHz) and a subcarrier spacing of 30 kHz, two BWPs may be configured to use a subcarrier spacing of 15 kHz and a subcarrier spacing of 30 kHz, respectively. Different BWPs may be frequency division multiplexed (FDMed), and when desiring to transmit or receive data at a specific subcarrier spacing, the BWP configured with the corresponding subcarrier spacing may be activated.

According to still another example, the base station may configure, in the UE, BWPs having bandwidths of different sizes for the purpose of reducing power consumption of the UE. For example, when the UE supports a very large bandwidth, for example, a bandwidth of 100 MHz, and always transmits or receives data through the corresponding bandwidth, very large power consumption may occur. In particular, in a situation in which there is no traffic, it is very inefficient, in terms of power consumption, for the UE to monitor an unnecessary downlink control channel for a large bandwidth of 100 MHz. Therefore, for the purpose of reducing power consumption of the UE, the base station may configure, for the UE, a bandwidth part of a relatively small bandwidth, for example, the bandwidth part of 20 MHz. In a situation in which there is no traffic, the UE may perform a monitoring operation in the bandwidth part of 20 MHz. When data has been generated, the UE may transmit or receive the data by using the bandwidth part of 100 MHz according to an indication of the base station.

In a method of configuring the bandwidth part, the UEs before the RRC connection may receive configuration information about the initial bandwidth part through the MIB in the initial access operation. More specifically, the UE may be configured with a control region (or control resource set (CORESET)) for a downlink control channel, through which downlink control information (DCI) for scheduling a system information block (SIB) may be transmitted, from a MIB of a physical broadcast channel (PBCH). The bandwidth of the control resource set configured through the MIB may be regarded as the initial BWP. The UE may receive a PDSCH, through which the SIB is transmitted, through the configured initial BWP. The initial BWP may be used for other system information (OSI), paging, and random access in addition to the reception of the SIB.

SSB/PBCH

Hereinafter, a synchronization signal (SS)/PBCH block (SSB) of a next generation mobile communication system (5G or NR system) will be described.

The SS/PBCH block may refer to a physical layer channel block including a primary SS (PSS), a secondary SS (SSS), and a PBCH. More specifically, the SS/PBCH block may be defined as follows:

- PSS: which is a signal that serves as a reference for downlink time/frequency synchronization, and may provide some information of a cell ID.
- SSS: which serves as a reference for downlink time/frequency synchronization, and may provide the remaining cell ID information that is not provided by the PSS. In addition, the SSS may serve as a reference signal for demodulation of the PBCH.
- PBCH: which may provide essential system information required for transmission or reception of a data channel and a control channel of a UE. The essential system information may include search space-related control information indicating radio resource mapping information of a control channel, scheduling control information for a separate data channel for transmission of system information, and the like.
- SS/PBCH block: the SS/PBCH block may include a combination of a PSS, an SSS, and a PBCH. One or multiple SS/PBCH blocks may be transmitted within 5 ms, and each of the transmitted SS/PBCH blocks may be distinguished by indices.

The UE may detect the PSS and the SSS in the initial access operation, and may decode the PBCH. The UE may acquire the MIB from the PBCH, and may be configured with the control resource set #0 through the MIB. The UE may monitor the control resource set #0 under the assumption that the selected SS/PBCH block and a demodulation reference signal (DMRS) transmitted in the control resource set #0 are quasi-co-located (QCLed). The UE may receive system information through downlink control information transmitted from the control resource set #0. The UE may acquire, from the received system information, random access channel (RACH)-related configuration information required for initial access. The UE may transmit a physical RACH (PRACH) to the base station by considering the selected SS/PBCH index, and the base station having received the PRACH may acquire information about an SS/PBCH block index selected by the UE. The base station may know which block is selected, by the UE, among the SS/PBCH blocks, and may know that the UE has monitored the control resource set #0 corresponding to (or associated with) the selected SS/PBCH block.

PDCCH: Downlink Control Information (DCI)

Subsequently, DCI in a next generation mobile communication system (5G or NR system) is described in detail.

In the next generation mobile communication system (5G or NR system), scheduling information for uplink data (or a physical uplink data channel (a PUSCH)) or downlink data (or a physical downlink data channel (a PDSCH)) is transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a PDCCH via a channel coding and modulation process. A cyclic redundancy check (CRC) may be added to a DCI message payload and may be scrambled by a radio network temporary identifier (RNTI) corresponding to the identity of the UE. Depending on the purpose of the DCI message, for example, UE-specific data transmission, a power control command, or a random access response, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI for scheduling a PDSCH for a random access response (RAR) message may be scrambled by a random access (RA)-RNTI. DCI for scheduling a PDSCH for a paging message may be scrambled by a paging (P)-RNTI. DCI for notifying of a slot format indicator (SFI) may be scrambled by an SFI-RNTI. DCI for notifying of transmit power control (TPC) may be scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information shown below in Table 3.

TABLE 3

| |
|---|
| Identifier for DCI formats - [1] bit |
| Frequency domain resource assignment - |

TABLE 3-continued

| |
|---|
| $[\lceil \log_2(N_{RB}^{UL,BWP}(N_{RB}^{UL,BWP}+1)/2)\rceil]$ bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| Transmit power control (TPC) command for scheduled PUSCH - [2] bits |
| UL/supplementary UL (SUL) indicator - 0 or 1 bit |

DCI format 0_1 may be used for non-fallback DCI for scheduling a PUSCH in which case the CRC may be scrambled by a C-RNTI. DCI format 0_1 in which the CRC is scrambled by the C-RNTI may include, for example, the following information shown below in Table 4.

TABLE 4

| |
|---|
| Carrier indicator - 0 or 3 bits |
| UL/SUL indicator - 0 or 1 bit |
| Identifier for DCI formats - [1] bits |
| Bandwidth part indicator - 0, 1 or 2 bits |
| Frequency domain resource assignment |
| For resource allocation type 0, $\lceil N_{RB}^{UL,BWP}/P\rceil$ bits |
| For resource allocation type 1, $\lceil \log_2(N_{RB}^{UL,BWP}(N_{RB}^{UL,BWP}+1)/2)\rceil$ bits |
| Time domain resource assignment –1, 2, 3, or 4 bits |
| Virtual resource block (VRB)-to-physical resource block (PRB) mapping - 0 or 1 bit, only for resource allocation type 1. |
| 0 bit if only resource allocation type 0 is configured; |
| 1 bit otherwise. |
| Frequency hopping flag - 0 or 1 bit, only for resource allocation type 1. |
| 0 bit if only resource allocation type 0 is configured; |
| 1 bit otherwise. |
| Modulation and coding scheme - 5 bits |
| New data indicator - 1 bit |
| Redundancy version - 2 bits |
| HARQ process number - 4 bits |
| 1st downlink assignment index - 1 or 2 bits |
| 1 bit for semi-static HARQ-ACK codebook; |
| 2 bits for dynamic HARQ-ACK codebook with single HARQ-ACK codebook. |
| 2nd downlink assignment index - 0 or 2 bits |
| 2 bits for dynamic HARQ-ACK codebook with two HARQ-ACK sub-codebooks; |
| 0 bit otherwise. |
| TPC command for scheduled PUSCH - 2 bits |
| SRS resource indicator $\left\lceil \log_2\left(\sum_{k=1}^{L_{max}}\binom{N_{SRS}}{k}\right)\right\rceil$ or $\lceil \log_2(N_{SRS})\rceil$ bits |
| $\left\lceil \log_2\left(\sum_{k=1}^{L_{max}}\binom{N_{SRS}}{k}\right)\right\rceil$ bits for non−codebook base PUSCH transmission; |
| $\lceil \log_2(N_{SRS})\rceil$ bits for codebook based PUSCH transmission. |
| Precoding information and number of layers -up to 6 bits |
| Antenna ports - up to 5 bits |
| SRS request - 2 bits |
| Channel state information (CSI) request - 0, 1, 2, 3, 4, 5, or 6 bits |
| Code block group (CBG) transmission information - 0, 2, 4, 6, or 8 bits |
| Phase tracking reference signal (PTRS)-DMRS association - 0 or 2 bits. |
| beta_offset indicator - 0 or 2 bits |
| DMRS sequence initialization - 0 or 1 bit |

DCI format 1_0 may be used for fallback DCI for scheduling a PDSCH in which case the CRC may be scrambled by a C-RNTI. DCI format 1_0 in which the CRC is scrambled by the C-RNTI may include, for example, the following information shown below in Table 5.

TABLE 5

| |
|---|
| Identifier for DCI formats - [1] bit |
| Frequency domain resource assignment - $\lceil \lceil \log_2(N_{RB}^{DL,BWP}(N_{RB}^{DL,BWP}+1)/2) \rceil \rceil$ bits |
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |
| TPC command for scheduled PUCCH - [2] bits |
| Physical uplink control channel (PUCCH) resource indicator - 3 bits |
| PDSCH-to-HARQ feedback timing indicator - [3] bits |

Alternatively, DCI format 1_0 may be used as DCI for scheduling a PDSCH for a RAR message in which case the CRC may be scrambled by a RA-RNTI. DCI format 1_0 in which the CRC is scrambled by the RA-RNTI may include, for example, the following information shown below in Table 6.

TABLE 6

| |
|---|
| Frequency domain resource assignment - $\lceil \lceil \log_2(N_{RB}^{DL,BWP}(N_{RB}^{DL,BWP}+1)/2) \rceil \rceil$ bits |
| Time domain resource assignment - 4 bits |
| VRB-to-PRB mapping - 1 bit |
| Modulation and coding scheme - 5 bits |
| TB scaling - 2 bits |
| Reserved bits - 16 bits |

DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information shown below in Table 7.

TABLE 7

| |
|---|
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP}/P \rceil$ bits |
| For resource allocation type 1, $\lceil \log_2(N_{RB}^{DL,BWP}(N_{RB}^{DL,BWP}+1)/2 \rceil$ bits |
| Time domain resource assignment - 1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| PRB bundling size indicator - 0 or 1 bit |
| Rate matching indicator - 0, 1, or 2 bits |
| Zero power (ZP) CSI-reference signal (RS) trigger - 0, 1, or 2 bits |

TABLE 7-continued

| |
|---|
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication - 0 or 3 bits |
| SRS request - 2 bits |
| Code block group (CBG) transmission information - 0, 2, 4, 6, or 8 bits |
| CBG flushing out information - 0 or 1 bit |
| DMRS sequence initialization - 1 bit |

Related to PDCCH, PDSCH QCL Rule

In the following, the QCL priority determination operation for the PDCCH will be described in detail.

The UE may select a specific control resource set according to the QCL priority determination operation and monitor control resource sets having the same QCL-TypeD characteristics as the corresponding control resource set, in case that the UE operates with carrier aggregation within a single cell or band and a plurality of control resource sets existing within an activated bandwidth part within a single or multiple cells have the same or different QCL-TypeD characteristics in a specific PDCCH monitoring interval and overlap each other in time. That is, when a plurality of control resource sets overlap in time, only one QCL-TypeD characteristic can be received. In this case, the criteria for determining the QCL priority may be as follows.

Criteria 1. A control resource set connected to the common search space with the lowest index, within a cell corresponding to the lowest index among cells including the common search space.

Criteria 2. A control resource set connected to the UE-specific search space with the lowest index, within a cell corresponding to the lowest index among cells including the UE-specific search space.

As described above, the next criterion is applied when each of the above criteria is not satisfied. For example, when control resource sets overlap in time in a specific PDCCH monitoring duration, if all control resource sets are not connected to a common search space but connected to a UE-specific search period, that is, if criteria 1 is not satisfied, the UE may omit the application of criteria 1 and apply criteria 2.

When selecting a control resource set based on the above criteria, the UE may additionally consider the following two items for QCL information configured to the control resource set. First, if control resource set 1 has CSI-RS 1 as a reference signal having a QCL-TypeD relationship, and a reference signal that this CSI-RS 1 has a QCL-TypeD relationship is SSB 1, and a reference signal that another control resource set 2 has a QCL-TypeD relationship is SSB 1, the UE may consider these two control resource sets 1 and 2 to have different QCL-TypeD characteristics. Second, if control resource set 1 has CSI-RS 1 configured in cell 1 as a reference signal having a QCL-TypeD relationship, and a reference signal that this CSI-RS 1 has a QCL-TypeD relationship is SSB 1, control resource set 2 has CSI-RS 2 configured in cell 2 as a reference signal having a QCL- TypeD relationship and a reference signal that this CSI-RS 2 has a QCL-TypeD relationship is SSB 1, the UE may consider the two control resource sets to have the same QCL-TypeD characteristics.

Figure 4:
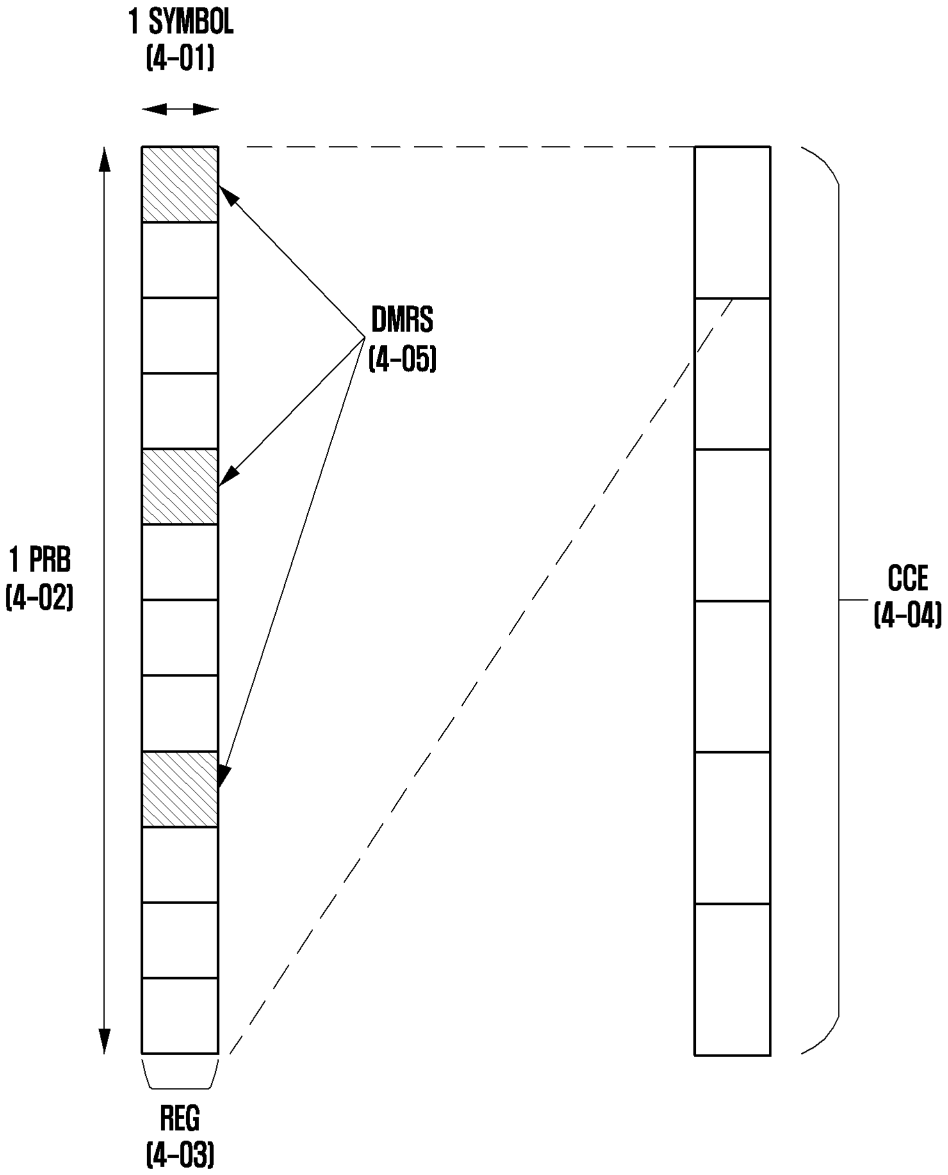
FIG. 4 illustrates a structure of a downlink control channel of a wireless communication system according to an embodiment of the disclosure.

FIG. 4 illustrates a structure of a downlink control channel in a wireless communication system according to an embodiment of the disclosure. That is, FIG. 4 illustrates an example of a basic unit of time and frequency resources configuring a downlink control channel that can be used in 4G according to an embodiment of the disclosure.

Referring to FIG. 4, the basic unit of time and frequency resources configuring a control channel may be defined as a resource element group (REG) 4-03. The REG 4-03 may be defined by 1 OFDM symbol 4-01 in time axis and one physical resource block (PRB) 4-02, that is, 12 subcarriers, in frequency axis. The base station may concatenate the REG 4-03 to configure a downlink control channel allocation unit.

Referring to FIG. 4, when a basic unit to which a downlink control channel is allocated in 5G is referred to as a control channel element (CCE) 4-04, 1 CCE 4-04 may include multiple REGs 4-03. For example, when the REG 4-03 may include 12 REs and 1 CCE 4-04 includes 6 REGs 4-03, shown in FIG. 4, 1 CCE 4-04 may include 72 REs. When the downlink control resource set is configured, the corresponding region may include multiple CCEs 4-04. A specific downlink control channel may be transmitted after being mapped to one or more CCEs 4-04 according to an aggregation level (AL) in the control resource set. The CCEs 4-04 in the control resource set are distinguished by numbers. Here, the numbers of the CCEs 4-04 may be assigned according to a logical mapping scheme.

The basic unit of the downlink control channel shown in FIG. 4, that is, the REG 4-03 may include both REs to which DCI is mapped and a region 4-04 to which a DMRS which is a reference signal for decoding the DCI is mapped. As shown in FIG. 4, three DMRSs 4-05 may be transmitted in 1 REG 4-03. The number of CCEs required for transmission of the PDCCH may be 1, 2, 4, 8, or 16 according to the aggregation level (AL). A different number of CCEs may be used to implement link adaptation of the downlink control channel. For example, in case that AL=L, one downlink control channel may be transmitted through L CCEs.

The UE needs to detect a signal in a state in which the UE does not know information about the downlink control channel, and a search space indicating a set of CCEs may be defined for blind decoding. The search space is a set of downlink control channel candidates including CCEs that the UE has to attempt to decode at a given AL. Since there are various ALs that make one bundle of 1, 2, 4, 8, or 16 CCEs, the UE may have multiple search spaces. A search space set may be defined as a set of search spaces at all configured ALs.

The search space may be classified into a common search space and a UE-specific search space. According to an embodiment of the disclosure, a predetermined group of UEs or all the UEs may examine the common search space of the PDCCH in order to receive cell common control information, such as dynamic scheduling of system information or a paging message.

For example, the UE may receive PDSCH scheduling allocation information for transmission of the SIB including cell operator information and the like by examining the common search space of the PDCCH. In a case of the common search space, since a predetermined group of UEs or all the UEs need to receive the PDCCH, the common search space may be defined as a set of previously promised CCEs. On the other hand, the UE may receive scheduling allocation information about the UE-specific PDSCH or PUSCH by examining the UE-specific search space of the PDCCH. The UE-specific search space may be UE-specifically defined as a function of the UE identity and various system parameters.

In 5G, the parameter for the search space of the PDCCH may be configured for the UE by from base station via higher layer signaling (e.g., SIB, MIB, and RRC signaling). For example, the base station may configure, in the UE, the number of PDCCH candidates at each aggregation level L, the monitoring periodicity for the search space, monitoring occasion of symbol units in the slots for the search space, the search space type (common search space or UE-specific search space), a combination of RNTI and DCI format to be monitored in the search space, a control resource set index to monitor the search space, and the like. For example, the configuration information described above may include the following pieces of information of Table 8 below.

TABLE 8

```
SearchSpace ::=                                   SEQUENCE {
      -- Identity of the search space. SearchSpaceId = 0 identifies the
SearchSpace configured via PBCH (MIB) or ServingCellConfigCommon.
      searchSpaceId
      SearchSpaceId,
   (search space identifier)
      controlResourceSetId
      ControlResourceSetId,
   (control resource set identifier)
      monitoringSlotPeriodicityAndOffset          CHOICE {
   (monitoring slot level period)
        sl1
      NULL,
        sl2
      INTEGER (0..1),
        sl4
      INTEGER (0..3),
        sl5
      INTEGER (0..4),
        sl8
      INTEGER (0..7),
        sl10
      INTEGER (0..9),
        sl16
      INTEGER (0..15),
        sl20
      INTEGER (0..19)
      }
                                                  OPTIONAL,
   duration (monitoring length)                  INTEGER (2..2559)
      monitoringSymbols WithinSlot                 BIT
STRING (SIZE (14))
                                              OPTIONAL,
   (monitoring symbol within slot)
      nrofCandidates
      SEQUENCE {
   (number of PDCCH candidates at each aggregation level)
        aggregationLevel1
      ENUMERATED {n0, n1, n2, n3, n4, n5, n6, n8},
        aggregationLevel2
      ENUMERATED {n0, n1, n2, n3, n4, n5, n6, n8},
        aggregationLevel4
      ENUMERATED {n0, n1, n2, n3, n4, n5, n6, n8},
        aggregationLevel8
      ENUMERATED {n0, n1, n2, n3, n4, n5, n6, n8},
        aggregationLevel16
      ENUMERATED {n0, n1, n2, n3, n4, n5, n6, n8}
      },
```

TABLE 8-continued

```
searchSpaceType
CHOICE {
(search space type)
  -- Configures this search space as common search space (CSS)
and DCI formats to monitor.
  common
SEQUENCE {
(common search space)
}
  ue-Specific
SEQUENCE {
(UE-specific search space)
  -- Indicates whether the UE monitors in this USS for
DCI formats 0-0 and 1-0 or for formats 0-1 and 1-1.
  formats
  ENUMERATED {formats0-0-And-1-0, formats0-1-And-1-1},
  ...
  }
```

The base station may configure one or more search space sets for the UE based on configuration information. According to an embodiment of the disclosure, the base station may configure search space set 1 and search space set 2 in the UE. The base station may configure search space set 1 and search space set 2 in the UE, DCI format A scrambled by X-RNTI in the search space set 1 may be configured to be monitored in the common search space, DCI format B scrambled by Y-RNTI in the search space set 2 may be configured to be monitored in a UE-specific search space.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

The common search space may be classified into a search space set of a specific type according to a purpose. An RNTI to be monitored may be different according to the determined type of search space set. For example, the common search space type, purpose, and RNTI to be monitored may be classified as Table 9 below.

TABLE 9

| Search space type | Purpose | RNTI |
|---|---|---|
| Type0 CSS | PDCCH transmission for SIB schedule | SI-RNTI |
| Type0A CSS | PDCCH transmission for SI schedule (SIB2 etc.) other than SIB1 | SI-RNTI |
| Type1 CSS | PDCCH transmission for random access response (RAR) schedule, Msg3 retransmission schedule, and Msg4 schedule | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
| | For PCell, PDCCH transmission for data schedule | C-RNTI, MCS-C-RNTI, CS-RNTI |

Meanwhile, in the common search space, the following combinations of the DCI format and the RNTI may be monitored. However, the disclosure is not limited thereto.

DCI format 0_0/1_0 with CRC scrambled by C-RNTI, configured scheduling (CS)-RNTI, semi-persistent (SP)-CSI-RNTI, RA-RNTI, temporary cell (TC)-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of the DCI format and the RNTI may be monitored. However, the disclosure is not limited thereto.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and usages described below.

Cell RNTI (C-RNTI): For UE-specific PDSCH scheduling

Temporary Cell RNTI (TC-RNTI): For UE-specific PDSCH scheduling

Configured Scheduling RNTI (CS-RNTI): For semi-statically configured UE-specific PDSCH scheduling Random access RNTI (RA-RNTI): For PDSCH scheduling in random access operation Paging RNTI (P-RNTI): For scheduling of PDSCH through which paging is transmitted System information RNTI (SI-RNTI): For PDSCH scheduling in which system information is transmitted Interruption RNTI (INT-RNTI): For notifying of whether to puncture PDSCH Transmit power control for PUSCH RNTI (TPC-PUSCH-RNTI): For indication of power control command for PUSCH Transmit power control for PUCCH RNTI (TPC-PUCCH-RNTI): For indication of power control command for PUCCH Transmit power control for SRS RNTI (TPC-SRS-RNTI): For indication of power control command for SRS In an embodiment, the above-described DCI formats may be defined as shown in Table 10 below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment of the disclosure, in 5G, multiple search space sets may be configured with different parameters (e.g., parameters in Table 8). Accordingly, the set of search space sets monitored by the UE may differ at each time point. For example, in case that search space set #1 is configured with a X-slot period, search space set #2 is configured with a Y-slot period, and X and Y are different, the UE may monitor both search space set #1 and space set

#2 in a specific slot, and may monitor one of search space set #1 and search space set #2 in a specific slot.

When a plurality of search space sets are configured for the UE, the following conditions may be considered in order to determine a search space set to be monitored by the UE.

Condition 1: Limit the Maximum Number of PDCCH Candidates

The number of PDCCH candidates that can be monitored per slot may not exceed $M^{\mu}$. The $M^{\mu}$ may be defined as the maximum number of PDCCH candidates per slot in a cell configured to a subcarrier spacing of $15 \cdot 2^{\mu}$ kHz, and may be defined as shown in Table 11 below.

TABLE 11

| μ | Maximum number of PDCCH candidates per slot and per serving cell ($M^{\mu}$) |
|---|---|
| 10 | 44 |
| 1 | 36 |
| 2 | 22 |
| 3 | 20 |

Condition 2: Limit the Maximum Number of CCEs

The number of CCEs configuring the entire search space per slot (here, the entire search space may denote the entire set of CCEs corresponding to a union region of multiple search space sets) may not exceed $C^{\mu}$. The $C^{\mu}$ may be defined as the maximum number of CCEs per slot in a cell configured to a subcarrier spacing of $15 \cdot 2^{\mu}$ kHz, and may be defined as shown in Table 12 below.

TABLE 12

| μ | Maximum number of non-overlapped CCEs per slot and per serving cell ($C^{\mu}$) |
|---|---|
| 0 | 56 |
| 1 | 56 |
| 2 | 48 |
| 3 | 32 |

For the convenience of description, a situation in which both conditions 1 and 2 are satisfied at a specific time point is defined as "condition A". Therefore, not satisfying condition A may refer to not satisfying at least one of the above conditions 1 and 2.

According to the configuration of the search space sets of the base station, a case in which condition A is not satisfied at a specific time point may occur. If condition A is not satisfied at a specific time point, the UE may select and monitor only some of the search space sets configured to satisfy condition A at a corresponding time point, and the base station may transmit PDCCH to the selected search space sets.

According to an embodiment of the disclosure, a method of selecting some search spaces from the entire configured search space set may conform to the following method.

If condition A for PDCCH is not satisfied at a specific time point (slot), the UE (or base station) may prioritize the selection of a search space set, in which a search space type is configured as a common search space, from among search space sets existing at a corresponding time point, than a search space set in which a search space type is configured as a UE-specific search space.

If all search space sets configured as common search spaces are selected (i.e., if condition A is satisfied even after all search spaces configured as common search spaces are selected), the UE (or base station) may select the search space sets configured as UE-specific search spaces. Here, if there are multiple search space sets configured as the UE-specific search spaces, a search space set having a low search space set index may have a higher priority. In consideration of the priority, the UE or base station may select the UE-specific search space sets within a range in which condition A is satisfied.

Methods of allocating time and frequency resources for data transmission in NR are described below.

In NR, the following detailed frequency domain resource allocation (FD-RA) methods may be provided in addition to frequency-domain resource candidate allocation through BWP indication.

Figure 5:
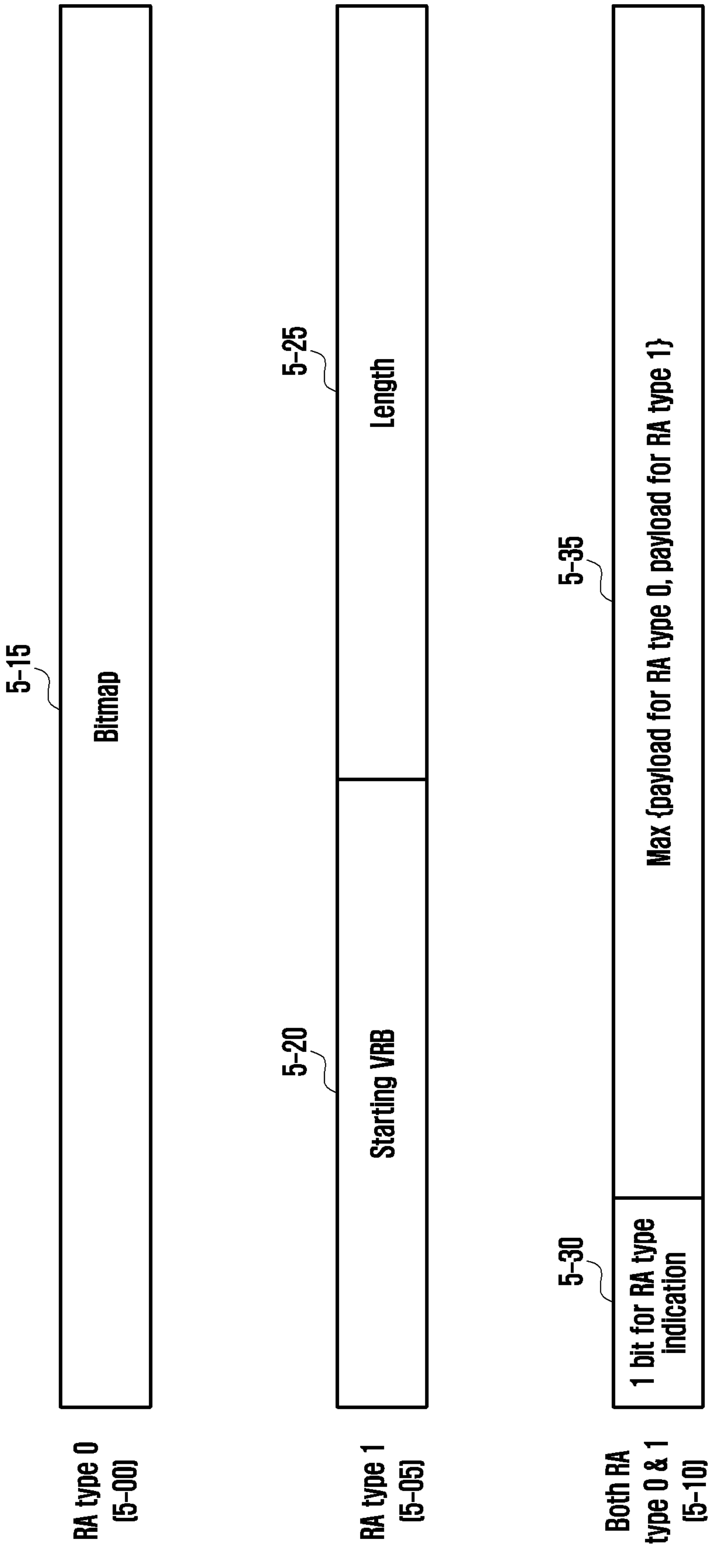
FIG. 5 illustrates an example of frequency domain resource allocation of a physical downlink shared channel (PDSCH) in a wireless communication system according to an embodiment of the disclosure.

FIG. 5 illustrates an example of frequency-domain resource allocation of a physical downlink shared channel (PDSCH) in a wireless communication system according to an embodiment of the disclosure.

FIG. 5 shows three frequency-domain resource allocation methods of type 0 (5-00), type 1 (5-05), and dynamic switch (5-10) configurable through a higher layer in NR.

Referring to FIG. 5, in case that a UE is configured to use only resource type 0 via higher layer signaling (indicated by reference numeral 5-00), some downlink control information (DCI) for allocation of PDSCH to the corresponding UE includes a bitmap configured by non-deterministic random bit Generator (NRBG) bits. Conditions for this will be described again later. Here, NRBG denotes the number of resource block groups (RBGs) determined as shown in Table 13 below according to a BWP size allocated by a BWP indicator and a higher layer parameter rbg-Size, and data is transmitted to RBG indicated as "1" by the bitmap.

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 via higher layer signaling (indicated by reference numeral 5-05), some DCI for allocation of the PDSCH to the UE includes frequency-domain resource allocation information configured by $$\left\lceil \log_2\left(N_{RB}^{DL,BWP}\left(N_{RB}^{DL,BWP}+1\right)/2\right)\right\rceil \text{ bits.}$$

Conditions for this will be described again later. Through this information, the base station may figure a starting VRB 5-20 and the length of frequency-domain resources 5-25 continuously allocated therefrom.

In case that the UE is configured to use both resource type 0 and resource type 1 via higher layer signaling (indicated by reference numeral 5-10), some DCI for allocation of PDSCH to the UE includes frequency-domain resource allocation information configured by bits of a greater value 5-35 among a payload 5-15 for configuration of resource type 0 and payloads 5-20 and 5-25 for configuration of resource type 1, and a condition for the above configuration will be described later. Here, one bit (indicated by reference numeral 5-30) may be added to the most significant bit (MSB) of the frequency-domain resource allocation information in the DCI, when the corresponding bit has a value of 0, it may indicate that resource type 0 is used, and when the corresponding bit has a value of 1, it may indicate that resource type 1 is used.

Hereinafter, a method of allocating time domain resources for a data channel in a next-generation mobile communication system (5G or NR system) will be described.

A base station may configure, for a UE, a table for time-domain resource allocation information for a downlink data channel (physical downlink shared channel (PDSCH)) and an uplink data channel (physical uplink shared channel (PUSCH)) via higher layer signaling (e.g., RRC signaling). With regard to PDSCH, a table including maxNrofDL–Allocations=16 entries may be configured, and with regard to PUSCH, a table including maxNrofUL–Allocations=16 entries may be configured. In an embodiment, the time-domain resource allocation information may include PDCCH-to-PDSCH slot timing (corresponding to a time gap in slot units between a time point of receiving a PDCCH and a time point of transmitting a PDSCH scheduled by the received PDCCH, and denoted as K0), PDCCH-to-PUSCH slot timing (corresponding to a time gap in slot units between a time point of receiving a PDCCH and a time point of transmitting a PUSCH scheduled by the received PDCCH, and denoted as K2), information on the position and length of a start symbol for which the PDSCH or PUSCH is scheduled within a slot, a mapping type of PDSCH or PUSCH, and the like. For example, the base station may notify the UE of information such as Table 14 or Table 15 below.

TABLE 14

```
PDSCH-TimeDomainResourceAllocationList information element
PDSCH-TimeDomainResourceAllocationList ::= SEQUENCE (SIZE(1..
maxNrofDL-Allocations)) OF PDSCH-TimeDomainResourceAllocation
PDSCH-TimeDomainResourceAllocation ::= SEQUENCE {
  k0 INTEGER (0..32)
  OPTIONAL, --Need S
  (PDCCH-to-PDSCH timing, slot units)
  mapping type ENUMERATED {typeA, typeB},
  (PDSCH mapping type)
  startSymbolAndLength INTEGER (0..127)
  (Start symbol and length of PDSCH)
}
```

TABLE 15

```
PUSCH-TimeDomainResourceAllocationList information element
PUSCH-TimeDomainResourceAllocationList ::= SEQUENCE (SIZE(1..
maxNrofUL-Allocations)) OF PUSCH-TimeDomainResourceAllocation
PUSCH-TimeDomainResourceAllocation ::= SEQUENCE {
  k2 INTEGER (0..32)
  OPTIONAL, --Need S
(PDCCH-to-PUSCH timing, slot units)
  mapping type ENUMERATED {typeA, typeB},
  (PUSCH mapping type)
  startSymbolAndLength INTEGER (0..127)
  (Start symbol and length of PUSCH)
}
```

The base station may notify the UE of one of the entries in the above-described table regarding the time-domain resource allocation information to via L1 signaling (e.g., DCI) (e.g., may be indicated by a "time-domain resource allocation" field in DCI). The UE may acquire time-domain resource allocation information for the PDSCH or PUSCH based on the DCI received from the base station.

Figure 6:
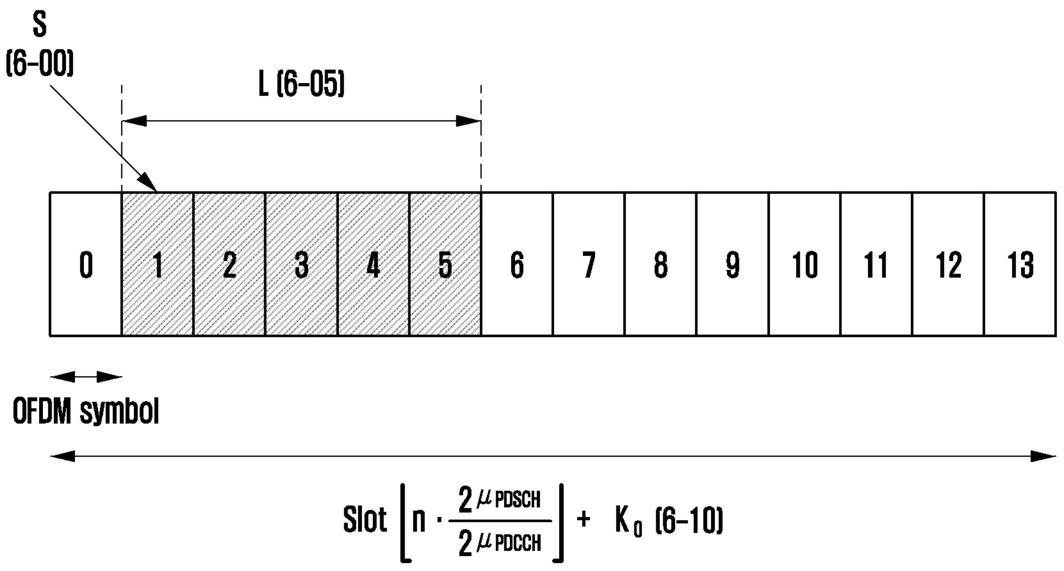
FIG. 6 illustrates an example of time domain resource allocation of a PDSCH in a wireless communication system according to an embodiment of the disclosure.

FIG. 6 illustrates an example of time-domain resource allocation of a PDSCH in a wireless communication system according to an embodiment of the disclosure.

Referring to FIG. 6, a base station may indicate a time-domain position of a PDSCH resource according to a start position 6-00 and a length 6-05 of an OFDM symbol in one slot 6-10, dynamically indicated based on the subcarrier spacing (SCS) ($\mu_{PDSCH}$, $\mu P_{DCCH}$) of a data channel and a control channel configured using a higher layer, the value of a scheduling offset ($K_0$), and DCI.

Figure 7:
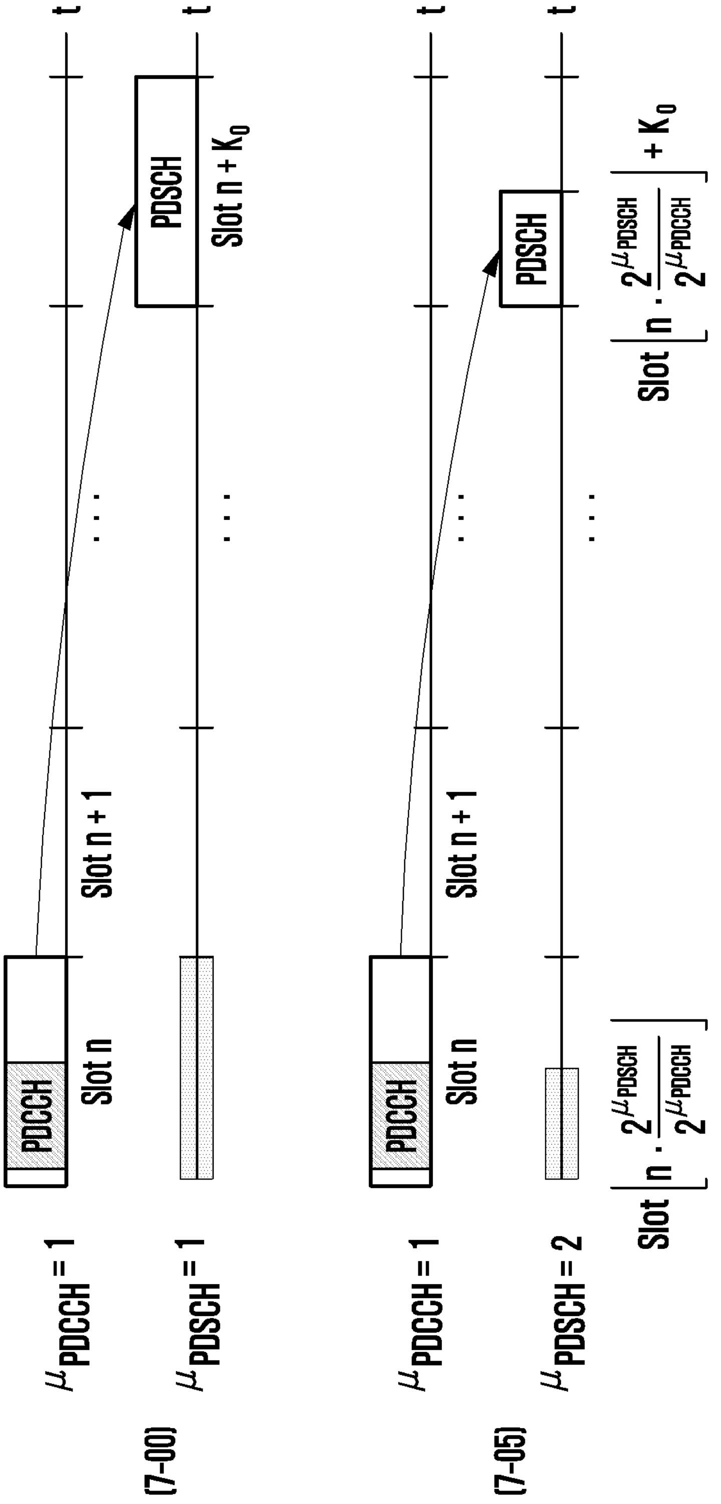
FIG. 7 illustrates an example of time-domain resource allocation according to a subcarrier spacing of a data channel and a control channel in a wireless communication system according to an embodiment of the disclosure.

FIG. 7 illustrates an example of time-domain resource allocation according to a subcarrier spacing of a data channel and a control channel in a wireless communication system according to an embodiment of the disclosure.

Referring to FIG. 7, if a data channel and a control channel have the same subcarrier spacing (7-00, $\mu_{PDSCH}=\mu_{PDCCH}$), since a data slot number and a control slot number are the same, a base station and a UE may recognize that a scheduling offset occurs in accordance with predetermined slot offset $K_0$. On the other hand, when the subcarrier spacing of the data channel and the subcarrier spacing of the control channel are different (7-05, $\mu_{PDSCH}\neq\mu_{PDCCH}$), a data slot number and a control slot number are different, and thus the base station and the UE may recognize that a scheduling offset occurs in accordance with predetermined slot offset $K_0$ based on the subcarrier spacing of the PDCCH.

QCL, TCI State

In the wireless communication system, one or more different antenna ports (or one or more channels, signals, and combinations thereof, but commonly referred to as different antenna ports for convenience of description) may be associated by a QCL configuration shown in Table 16, below. The TCI state is to inform of a QCL relation between a PDCCH (or a PDCCH DMRS) and another RS or channel, and a reference antenna port A (e.g., reference RS #A) and another purpose antenna port B (e.g., target RS #B) which are QCLed means that the UE is allowed to apply some or all of large-scale channel parameters estimated in the antenna port A to channel measurement from the antenna port B. The QCL is required to associate different parameters according to conditions, such as time tracking influenced by average delay and delay spread, frequency tracking influenced by Doppler shift and Doppler spread, radio resource management (RRM) influenced by an average gain, and beam management (BM) influenced by a spatial parameter. Accordingly, NR supports four types of QCL relations shown in Table 16, below.

TABLE 16

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

A spatial Rx parameter may refer to some or all of an angle of arrival (AoA), a power angular spectrum (PAS) of AoA, an angle of departure (AoD), a PAS of AoD, a transmission/reception channel correlation, transmission/reception beamforming, and a spatial channel correlation.

The QCL relation can be configured in the UE through RRC parameter TCI-state and QCL-Info as shown in Table 17, below. Referring to Table 17 below, the BS may configure one or more TCI states in the UE and inform the UE of a maximum of two QCL relations (QCL-Type 1 and QCL-Type 2) for an RS referring to an ID of the TCI state, that is, a target RS. At this time, each piece of the QCL information (QCL-Info) included in the TCI state includes a serving cell index and a BWP index of a reference RS indicated by the corresponding QCL information, a type and an ID of the reference RS, and the QCL type as shown in Table 16, above.

TABLE 17

```
TCI-State ::=                          SEQUENCE {
   tci-StateId                             TCI-StateId,
   (ID of corresponding TCI state)
   qcl-Type1                               QCL-Info,
   (QCL information of first reference RS of RS (target RS) referring to
corresponding TCI state ID)
   qcl-Type2                               QCL-Info
        OPTIONAL, -- Need R
   (QCL information of second reference RS of RS (target RS) referring to
corresponding TCI state ID)
   ...
}
QCL-Info ::=                           SEQUENCE {
   cell                                    ServCellIndex
        OPTIONAL, -- Need R
   (serving cell index of reference RS indicated by corresponding QCL
information)
   bwp-Id                                    BWP-Id
        OPTIONAL, -- Cond CSI-RS-Indicated
   (BWP index of reference RS indicated by corresponding QCL
   information)
   referenceSignal                         CHOICE {
      csi-rs                                  NZP-CSI-RS-
ResourceId,
      ssb                                       SSB-
Index
      (one of CSI-RSI ID or SSB ID indicated by corresponding QCL
information)
   },
   qcl-Type                                ENUMERATED
{typeA, typeB, typeC, typeD},
   ...
}
```

Method and Apparatus for Transmitting HARQ-ACK Feedback

The NR system employs a hybrid automatic repeat request (HARQ) method for retransmitting corresponding data in a physical layer when decoding failure occurs in initial transmission. In the HARQ method, when a receiver fails to accurately decode data, the receiver transmits information (negative acknowledgment (NACK)) indicating decoding failure to the transmitter so that the transmitter can retransmit the corresponding data in the physical layer. The receiver improves data reception performance by combining data retransmitted by the transmitter with previously failed data to be decoded. In addition, when the receiver correctly decodes the data, the receiver may transmit information (acknowledgment (ACK)) indicating success of decoding to the transmitter so that the transmitter can transmit new data.

In the following disclosure, a method and apparatus for transmitting HARQ-ACK feedback for downlink data transmission will be described. Specifically, a method of configuring HARQ-ACK feedback bits when a UE intends to transmit multiple HARQ-ACKs within one slot in uplink will be described.

In a wireless communication system, in particular, a new radio (NR) system, a base station may configure one component carrier (CC) or a plurality of CCs for downlink transmission to a terminal. In addition, downlink transmission and uplink transmission slots and symbols may be configured in each CC. Meanwhile, when Physical Downlink Shared Channel (PDSCH), which is downlink data, is scheduled, at least one of slot timing information to which PDSCH is mapped in a specific bit field of Downlink Control Information (DCI), a starting symbol position to which the PDSCH is mapped within the corresponding slot, and information on the number of symbols to which the PDSCH is mapped may be transmitted. For example, when DCI is delivered in slot n and PDSCH is scheduled, when K0, which is the timing information of the slot through which the PDSCH is delivered, indicates 0, the start symbol position is 0, and the symbol length is 7, the corresponding PDSCH is mapped to 7 symbols from symbol 0 of slot n and transmitted. Meanwhile, PDSCH, which is a downlink data signal, is transmitted, and HARQ-ACK feedback is transmitted from the UE to the base station after K1 slot. K1 information, which is timing information for which the HARQ-ACK is transmitted, is delivered from DCI, and a candidate set of possible K1 values is delivered in higher signaling, and one of them can be determined in DCI.

When the UE receives the semi-static HARQ-ACK codebook configuration, the UE may determine a table including K0, which is information about slots to which the PDSCH is mapped, start symbol information, number of symbols or length information, and the feedback bits (or HARQ-ACK codebook size) to be transmitted based on K1 candidate values, which are HARQ-ACK feedback timing information for the PDSCH. The table including slot information, start symbol information, number of symbols, or length information to which PDSCH is mapped may follow a default value, or may be configured by a base station to a terminal.

When the UE receives the dynamic HARQ-ACK codebook, the UE may determine the HARQ-ACK feedback bits (or HARQ-ACK codebook size) to be transmitted by the DAI (downlink assignment indicator) information included in the DCI in the slot in which the HARQ-ACK information is transmitted based on K0, which is the slot information to which the PDSCH is mapped, and the HARQ-ACK feedback timing information K1 value for the PDSCH.

Figure 8:
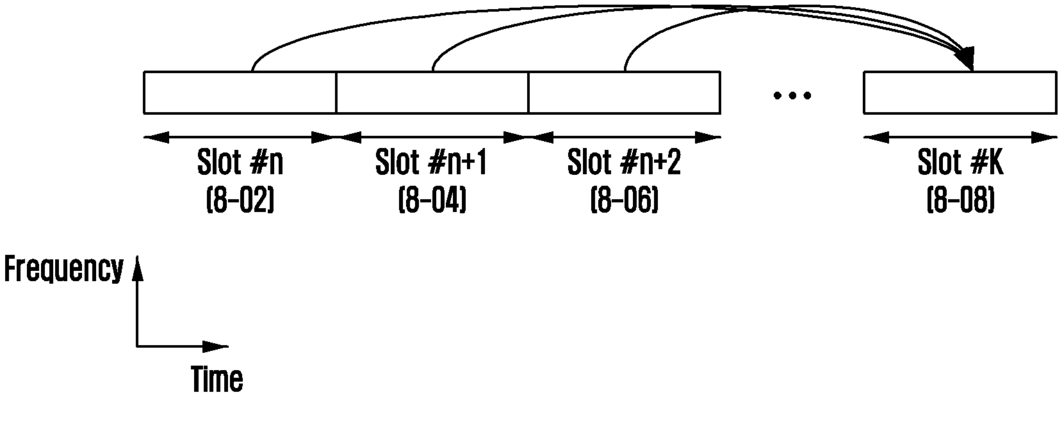
FIG. 8 is a view illustrating a method of configuring a semi-static hybrid automatic repeat request (HARQ)-acknowledgment (ACK) codebook in an NR system according to an embodiment of the disclosure.

FIG. 8 is a view illustrating a method of configuring a semi-static HARQ-ACK codebook in an NR system according to an embodiment of the disclosure.

In a situation where the number of HARQ-ACK PUCCHs that can be transmitted by the UE is limited to one in one slot, when the UE receives a higher layer signal for configuring a semi-static HARQ-ACK codebook, the UE may report HARQ-ACK information for PDSCH reception or SPS (semi-persistent scheduling) PDSCH release within the HARQ-ACK codebook in a slot indicated by the value of the PDSCH-to-HARQ_feedback timing indicator field included in DCI format 1_0 or DCI format 1_1. The UE may report the HARQ-ACK information bit value in the HARQ-ACK codebook as NACK in a slot not indicated by the PDSCH-to-HARQ_feedback timing indicator field in DCI format 1_0 or DCI format 1_1. If the UE reports only HARQ-ACK information for one SPS PDSCH release or one PDSCH reception in MA,c cases for candidate PDSCH reception, and the report is scheduled by DCI format 1_0 including information indicating that the counter DAI field is 1 in the Pcell, the UE may determine one HARQ-ACK codebook for the corresponding SPS PDSCH release or the corresponding PDSCH reception.

Otherwise, the HARQ-ACK codebook determination method according to the following method may be followed.

If MA,c is the set of PDSCH reception candidate cases in the serving cell c, MA,c can be obtained through the following [pseudo-code 1] steps.

[Start pseudo-code 1]

Step 1: j is initialized to 0 and MA,c is initialized to the empty set. k, the HARQ-ACK transmission timing index, is initialized to 0.

Step 2: R is configured to a set of rows in a table including slot information to which PDSCH is mapped, start symbol information, symbol number or length information. If a PDSCH-capable mapping symbol indicated by each value of R is configured as a UL symbol according to the DL and UL configurations configured at the higher layer, the corresponding row is deleted from R.

Step 3-1: The UE may receive one PDSCH for unicast in one slot, and when R is not an empty set, one is added to the set MA,c.

Step 3-2: If the UE may receive more than one PDSCH for unicast in one slot, the number of PDSCHs that can be allocated to different symbols is counted in the calculated R and the corresponding number is added to MA,c.

Step 4: k is incremented by 1 to start again from step 2.

[end of pseudo-code 1]

Referring to the aforementioned pseudo-code 1 with reference to FIG. 8, in order to perform HARQ-ACK PUCCH transmission in slot #k 8-08, the UE may consider all slot candidates capable of PDSCH-to-HARQ-ACK timing that may indicate slot #k 8-08. In FIG. 8, it is assumed that HARQ-ACK transmission is possible in slot #k 8-08 by combining PDSCH-to-HARQ-ACK timing, which is possible only for PDSCHs scheduled in slot #n 8-02, slot #n+1 8-04 and slot #n+2 8-06. In addition, the maximum number of schedulable PDSCHs for each slot may be derived in consideration with time domain resource configuration information of PDSCHs that can be scheduled in slots 8-02, 8-04, and 8-06, respectively, and information indicating whether the symbol in the slot is downlink or uplink. For example, if maximum scheduling is possible for 2 PDSCHs in slot 8-02, 3 PDSCHs in slot 8-04, and 2 PDSCHs in slot 8-06, respectively, the maximum number of PDSCHs included in the HARQ-ACK codebook transmitted in slots 8-08 is 7 in total. This is called the cardinality of the HARQ-ACK codebook.

Figure 9:
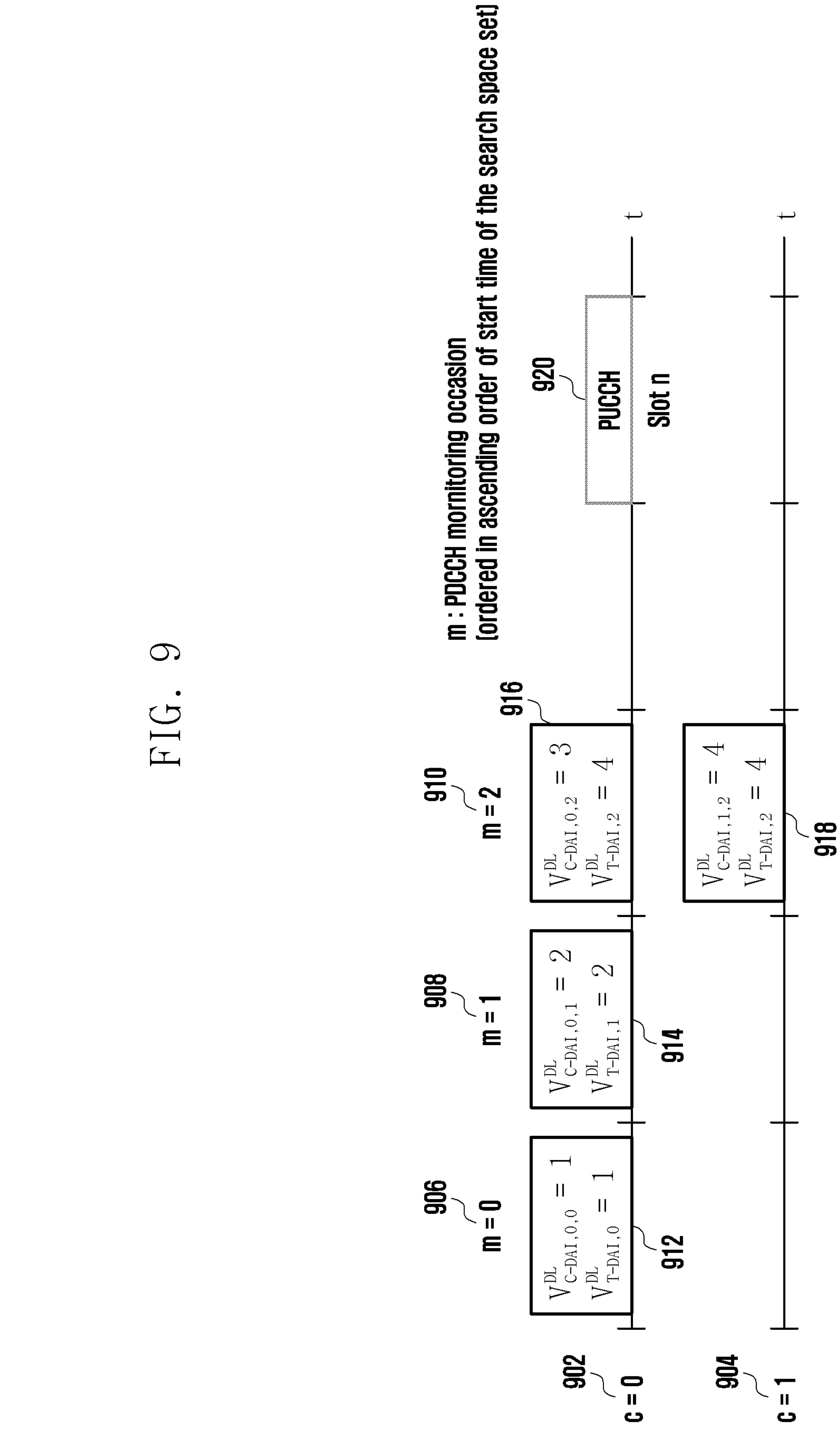
FIG. 9 is a view illustrating a method of configuring a dynamic HARQ-ACK codebook in an NR system according to an embodiment of the disclosure.

FIG. 9 is a view illustrating a method of configuring a dynamic HARQ-ACK codebook in an NR system according to an embodiment of the disclosure.

The UE may transmit HARQ-ACK information transmitted within one PUCCH in corresponding slot n, based on the PDSCH-to-HARQ_feedback timing value for PUCCH transmission of HARQ-ACK information for PDSCH reception or SPS PDSCH release, and K0, which is transmission slot location information of PDSCH scheduled in DCI format 1_0 or 1_1.

Specifically, for the above-described HARQ-ACK information transmission, the UE may determine the HARQ-ACK codebook of the PUCCH transmitted in the slot determined by PDSCH-to-HARQ_feedback timing and K0, based on DAI included in DCI indicating PDSCH or SPS PDSCH release.

The DAI is composed of a counter DAI (cCounter DAI) and a total DAI (tTotal DAI). The counter DAI is information indicating the location of HARQ-ACK information corresponding to a PDSCH scheduled in DCI format 1_0 or DCI format 1_1 in the HARQ-ACK codebook. Specifically, the value of counter DAI in DCI format 1_0 or 1_1 informs the accumulated value of PDSCH reception or SPS PDSCH release scheduled by DCI format 1_0 or DCI format 1_1 in a specific cell c. The aforementioned accumulated value is configured based on a PDCCH monitoring occasion and a serving cell in which the scheduled DCI exists.

Total DAI is a value indicating the HARQ-ACK codebook size. Specifically, the value of the total DAI means the total number of previously scheduled PDSCH or SPS PDSCH releases, including the time point at which DCI is scheduled (PDCCH monitoring occasion). In addition, the total DAI is a parameter used when HARQ-ACK information on the serving cell c in the carrier aggregation (CA) situation also includes HARQ-ACK information for a PDSCH scheduled in another cell including the serving cell c. In other words, the total DAI parameter does not exist in a system operating with one cell.

FIG. 9 is a view illustrating an example of an operation of a UE related to the DAI when a dynamic HARQ-ACK codebook is used. FIG. 9 illustrates changes in values of Counter DAI (C-DAI) and Total DAI (T-DAI) indicated by DCI discovered for each PDCCH monitoring occasion set for each carrier, when transmitting the HARQ-ACK codebook selected based on the DAI on the PUCCH (920) in the nth slot of carrier 0 (902), in a case where the UE is configured with two carriers (c). First, in the DCI searched at m=0 (906), C-DAI and T-DAI indicate a value of 1 (912). In the DCI searched at m=1 (908), C-DAI and T-DAI each indicate a value of 2 (914). In the DCI discovered in carrier 0 (c=0, 902) of m=2 (910), C-DAI indicates a value of 3 (916). In the DCI discovered in carrier 1 (c=1, 904) of m=2 (910), C-DAI indicates a value of 4 (918). In this case, when carriers 0 and 1 are scheduled on the same monitoring occasion, both T-DAIs are indicated as 4.

Referring to FIGS. 8 and 9, HARQ-ACK codebook determination can operate under the assumption that only one PUCCH containing HARQ-ACK information is transmitted in one slot. As an example of a method for determining one PUCCH transmission resource in one slot, when PDSCHs scheduled in different DCIs are multiplexed and transmitted in one HARQ-ACK codebook in the same slot, the PUCCH resource selected for HARQ-ACK transmission may be determined as a PUCCH resource indicated by a PUCCH resource field indicated in the DCI that schedules the PDSCH last. That is, the PUCCH resource indicated by the PUCCH resource field indicated in the DCI scheduled before the DCI is ignored.

Method and Device for Canceling Uplink Transmission

When eMBB traffic and URLLC traffic coexist in the NR system, a method of canceling eMBB uplink data transmission or SRS transmission has been added to improve the safety and speed of URLLC. If the UE is configured for UplinkCancellation by higher layer signaling, the UE may be provided with discovery information and CCE aggregation level information capable of monitoring DCI format 2_4, which is a UE common DCI scrambled with ci-RNTI (cancellation indication-radio network temporary identifier) in one or multiple cells. In addition, the UE may be provided with higher layer signaling, such as the location of necessary information in the UE common DCI and the time-frequency domain in which uplink transmission is canceled. The UE may not transmit the PUSCH or SRS if the indicated uplink transmission cancellation region and the PUSCH or SRS overlap at least one symbol.

Method and Apparatus for Deferring HARQ-ACK for SPS PDSCH

In the URLLC of the NR system, when the HARQ-ACK for the SPS PDSCH overlaps with transmission of a downlink symbol or SSB and is canceled, a method of deferring and transmitting HARQ-ACK information for this is added. When spsHARQdeferral is configured by upper layer signaling and the following conditions are satisfied, the UE may determine new PUCCH resources for HARQ-ACK information of SPS PDSCH reception included in existing PUCCH resources:

When the existing PUCCH resource is configured to SPS-PUCCH-AN-List, or when SPS-PUCCH-AN-List is not configured and provided as n1PUCCH-AN, When overlapping with PUSCH or PUCCH having higher priority but not being canceled, and/or When overlapping with downlink TDD pattern, SSB or CORESET #0.

In this case, after determining multiplexing of PUCCH and PUSCH in the most recent uplink slot, the UE may transmit HARQ-ACK information included in the existing PUCCH on a new PUCCH or PUSCH.

Method and Apparatus for Retransmission of HARQ-ACK Codebook

A method of retransmitting only the dropped HARQ-ACK information instead of starting from PDSCH retransmission is added when PUCCH or PUSCH including HARQ-ACK information is dropped by uplink signals having higher priority in the URLLC of NR system.

Figure 10:
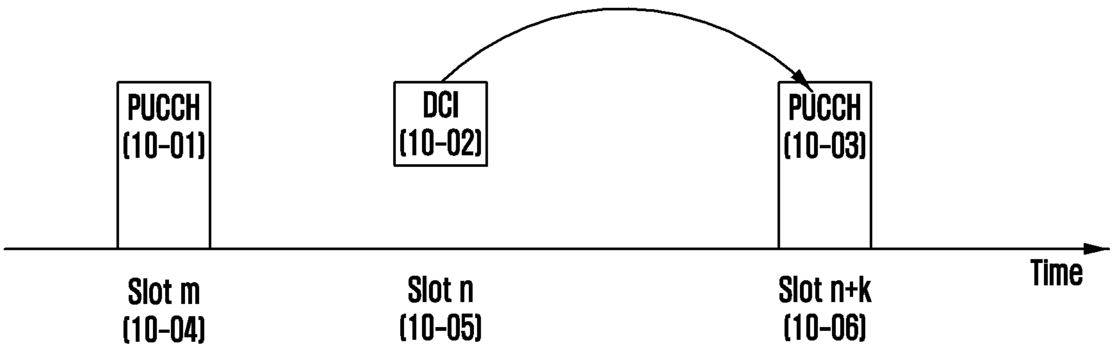
FIG. 10 is a view illustrating a method of configuring a HARQ-ACK codebook retransmission in an NR system according to an embodiment of the disclosure.

FIG. 10 is a view illustrating a method of configuring HARQ-ACK codebook retransmission in an NR system according to an embodiment of the disclosure.

Referring to FIG. 10, it is assumed that transmission of a PUCCH (10-01) including a Type-1 codebook or a Type-2 codebook in slot m (10-04) is dropped by an uplink signal having a higher priority. For retransmission of the HARQ-ACK information included in the dropped PUCCH (10-01), the UE may be instructed by the base station of DCI format (10-02) that is CRC scrambled with C-RNTI or MCS-RNTI and does not schedule PDSCH. When the last slot of the PDCCH including the DCI format is slot n (10-05), the DCI format may instruct to the UE PUCCH transmission (10-03) including the HARQ-ACK codebook included in the previous PUCCH (10-01) in slot n+k (10-06). In this case, slot n+k is located after slot m.

If the value of pdsch-HARQ-ACK-retx or pdsch-HARQ-ACK-retxDCI-1-2, which is a field included in DCI format 1_1 or 1_2, is '1', the UE may determine m of slot m as follows:

m=n−1, 1 has a value between −7 and 24, 1 may be determined by one-to-one mapping in ascending order among the MCS fields of DCI format 1_1 or DCI format 1_2.

The UE may also multiplex and transmit a HARQ-ACK codebook different from the existing HARQ-ACK codebook on a PUCCH transmitted in slot n+k. The multiplexing operation may follow the existing HARQ-ACK codebook multiplexing operation.

TDD UL-DL Pattern and SFI

In the 5G communication system, a downlink signal transmission period and an uplink signal transmission period may be dynamically changed. To this end, the base station may indicate to the UE whether each of the OFDM symbols constituting one slot is a downlink symbol, an uplink symbol, or a flexible symbol through a slot format indicator (SFI). Here, the flexible symbol may mean a symbol that is not both a downlink and an uplink symbol, or a symbol that can be changed to a downlink or uplink symbol by UE-specific control information or scheduling information. In this case, the flexible symbol may include a gap guard required in a process of switching from downlink to uplink.

The UE receiving the slot format indicator may receive a downlink signal from the base station in the symbol indicated by the downlink symbol, and transmit an uplink signal to the base station in the symbol indicated by the uplink symbol. For a symbol indicated as a flexible symbol, the UE may perform at least a PDCCH monitoring operation, receive a downlink signal from the base station in the flexible symbol through another indicator (e.g., when DCI format 1_0 or 1_1 is received), for example, DCI, or transmit an uplink signal to the base station (e.g., upon receiving DCI format 0_0 or 0_1).

Figure 11:
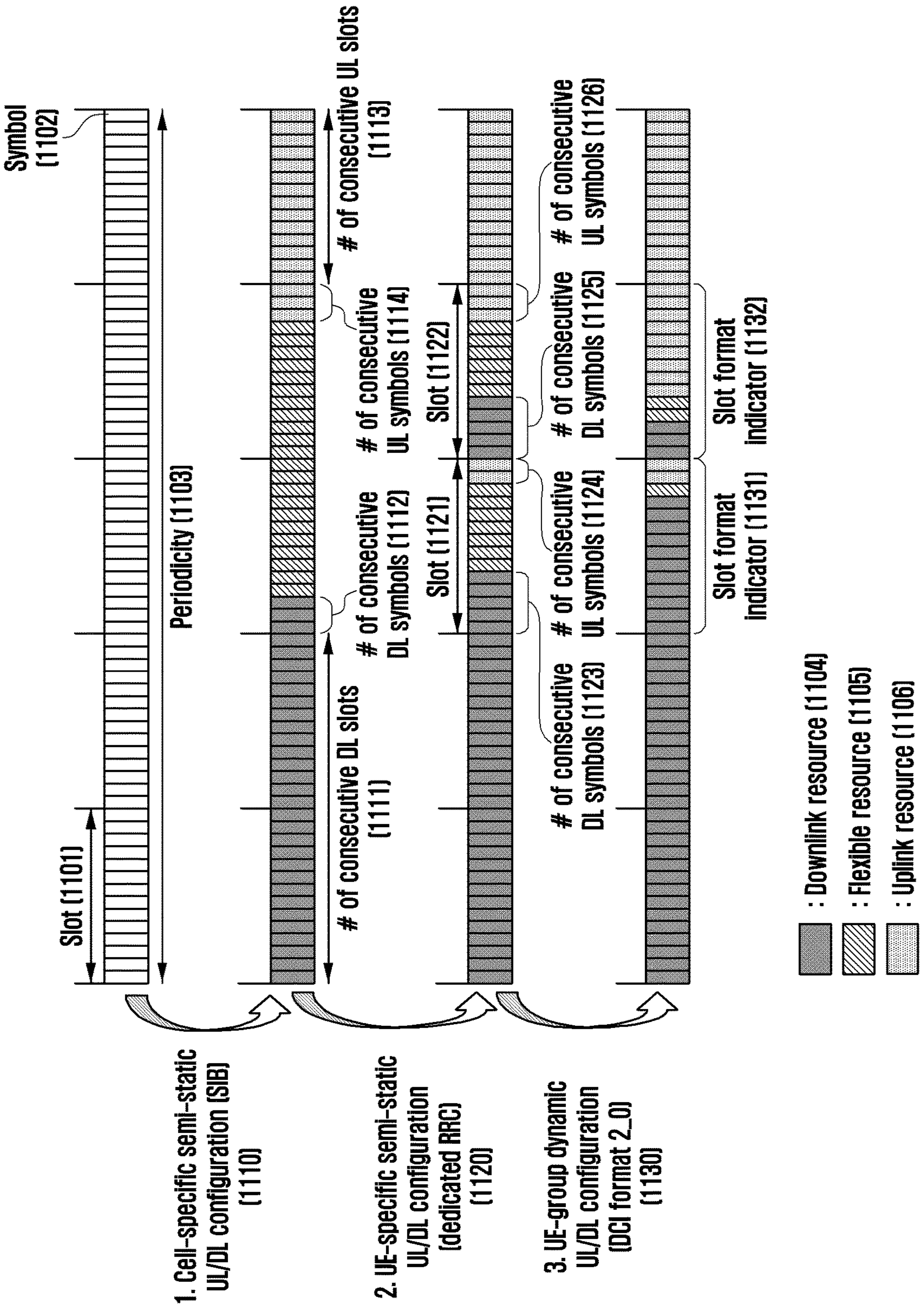
FIG. 11 illustrates an example of uplink-downlink configuration (UL/DL configuration) in a 5G system according to an embodiment of the disclosure.

FIG. 11 illustrates an example of uplink-downlink configuration (UL/DL configuration) in a 5G system. FIG. 11 illustrates three steps of uplink-downlink configuration of symbols/slots according to an embodiment of the disclosure.

Referring to FIG. 11, in a first step, cell-specific configuration information 1110 for configuring uplink-downlink in a semi-static manner may be configured.

For example, uplink-downlink of a symbol/slot may be configured through system information such as SIB. Specifically, the cell-specific uplink-downlink configuration information 1110 in the system information may include uplink-downlink pattern information and information indicating a reference subcarrier interval. The uplink-downlink pattern information may indicate a transmission periodicity 1103 of each pattern, the number of consecutive full DL slots 1101 at the beginning of each DL-UL pattern 1111, the number of consecutive downlink symbols 1102 from the start of the next slot (number of consecutive DL symbols in the beginning of the slot following the last full DL slot) 1112, the number of consecutive full UL slots at the end of each DL-UL pattern 1113, and the number of consecutive UL symbols in the end of the slot preceding the first full UL slot 1114. In this case, the UE may determine slots/symbols not indicated as uplink or downlink as flexible slots/symbols.

As a second step, the UE-specific configuration information 1120 transmitted through UE-specific higher layer signaling (i.e., RRC signaling) indicates symbols to be configured for downlink or uplink within flexible slots or slots 1121 and 1122 including flexible symbols. For example, the UE-specific uplink-downlink configuration information 1120 may include slot indexes indicating slots 1121, 1122 containing flexible symbols, the number of consecutive DL symbols in the beginning of the slot 1123, 1125, the number of consecutive UL symbols in the end of the slot 1124, 1126, or may include information indicating the entire downlink or information indicating the entire uplink for each slot. In this case, the symbol/slot configured for uplink or downlink through the cell specific configuration information 1110 of the first step may be changed to downlink or uplink through UE-specific higher layer signaling 1120.

As a third step, in order to dynamically change the downlink signal transmission period and the uplink signal transmission period, the downlink control information of the downlink control channel includes a slot format indicator 1130 that indicates whether each symbol is a downlink symbol (or downlink resource 1104), an uplink symbol (or uplink resource 1106), or a flexible symbol (or flexible resource 1105) in each slot among a plurality of slots starting from the slot in which the UE detects the downlink control information. In this case, for the symbols/slots configured to uplink or downlink in the first and second steps, the slot format indicator cannot indicate that they are downlink or uplink. In the first and second steps, the slot format of each slot 1131 or 1132 including at least one symbol not configured for uplink or downlink may be indicated by corresponding downlink control information.

The slot format indicator may indicate an uplink-downlink configuration for 14 symbols in one slot as shown in Table 18 below. The slot format indicator may be simultaneously transmitted to a plurality of terminals through a UE group (or cell) common control channel. In other words, the downlink control information including the slot format indicator may be transmitted through a CRC-scrambled PDCCH with an identifier different from the UE-specific C-RNTI (cell-RNTI), for example, SFI-RNTI. The downlink control information may include slot format indicators for one or more slots, that is, N slots. Here, the value of N may be an integer greater than 0 or a value configured by the UE through higher layer signaling from the base station among a set of predefined possible values such as 1, 2, 5, 10, 20 and the like. The size of the slot format indicator may be configured by the base station to the UE through higher layer signaling. Table 18 is a table describing the contents of SFI.

TABLE 18

| | Number (or index) of symbol in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| | | | | | . . . | | | | | | | | | |
| 9 | F | F | F | F | F | F | F | F | F | F | F | F | U | U |
| | | | | | . . . | | | | | | | | | |
| 19 | D | F | F | F | F | F | F | F | F | F | F | F | F | U |
| | | | | | . . . | | | | | | | | | |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

In Table 18, D means a downlink symbol, U means an uplink symbol, and F means a flexible symbol. According to Table 18, the total number of slot formats supportable for one slot is 256. The maximum size of information bits that may be used for slot format indication in the NR system is 128 bits, and the base station may configure the UE to the UE through higher layer signaling, for example, 'dci-PayloadSize'.

Based on the above descriptions, embodiments of the disclosure will be described in detail.

Coverage is a really important factor in a wireless communication system. Currently, 5G is commercialized, and millimeter wave is also included in commercialization, but due to limited coverage, there are not many actual uses. Many operators are looking for an economical way to provide stable coverage while at the same time. The case of installing multiple base stations can be considered, but due to the high cost, a more economical method has been sought.

For this reason, the first technology considered was integrated access and backhaul (IAB), which was studied across Rel-16 and Rel-17. The IAB is a kind of relay that does not require a backhaul network connected by wire and plays a relay role between the base station and the terminal. The IAB has performance similar to that of the base station, but has the disadvantage of increasing cost. Second, an existing RF repeater can be considered. An RF repeater is the most basic unit repeater that amplifies and transmits an incoming signal. The RF repeater has the advantage of being inexpensive because the RF repeater simply performs operations of amplifying and transmitting, but cannot actively cope with various situations. For example, a beamforming gain cannot be obtained because the RF repeater generally does not use a directional antenna but uses an omnidirectional antenna (omni-antenna). In addition, even when there is no UE connected to the RF repeater, it may be a source of interference because noise is amplified and transmitted. Since the IAB and the RF repeater are biased in either direction between performance and cost, their advantages and disadvantages are obvious. In order to realistically increase coverage, not only performance but also cost should be considered, so the need for a new UE or amplifier is emerging.

In 3GPP Rel-18, research on a network-controlled repeater (NCR), which maintains simple amplification and transmission operations of RF repeaters and enables beamforming technology with an adaptive antenna, is in progress. In order for an NCR to send a signal to a UE using an adaptive antenna within a cell of a base station, the NCR should be able to receive a control signal from the base station. Accordingly, the NCR may be composed of network-controlled repeater-mobile termination (NCR-MT) and network-controlled repeater-forwarding unit (NCR-FU), similar to IAB. The NCR-MT may perform communication like a normal UE from the point of view of the base station. On the other hand, the NCR-FU may be composed of only a basic RF or physical layer, and may perform transmission and reception operations using an adaptive antenna under control of a base station. The NCR may perform dynamic TDD configuration, on/off for interference control, or power control as well as transmission and reception operations using an adaptive antenna.

The NCR basically may amplify the signal transmitted from the base station and transmits it to the UE, and amplify the signal transmitted from the UE and transmits the amplified signal to the base station. That is, the NCR may simply amplify and transmit a signal or channel transmitted and received between the base station and the UE without detecting or decoding the signal. Therefore, from the standpoint of the UE, it is unknown whether the NCR is involved in communication between the base station and the terminal. In other words, from the standpoint of the UE, the base station and the NCR cannot be distinguished, and the NCR may look like the base station. Because the UE does not need any additional information or operation for the NCR, the NCR can be supported in any release terminal.

As described above, from the point of view of the base station, the NCR may be seen as a general UE. When the NCR is installed for the first time, the NCR may perform initial access to the base station like a general UE, and after higher layer connection (e.g., RRC connection) is made, the NCR may receive configurations that may be received by the UE from the base station. After being connected to the base station, the NCR may amplify and transmit. From the point of view of the base station, it is necessary to know whether the UE is directly connected to the base station or connected through the NCR. When the UE is within the coverage of the NCR, the UE may communicate with the base station through the NCR, and the base station may recognize this through implementation.

The base station can know which UE communicates through which NCR, but the NCR cannot know this fact. From the point of view of the NCR, regardless of which UE is in its coverage or not, an operation to amplify and send a signal to a UE as controlled by the base station may be performed. In order for the base station to control the NCR, a control signal similar to DCI may be required. In the disclosure, this control signal is defined as side control information (SCI) for convenience. The SCI is not limited to the terms described later in the disclosure, and other terms having equivalent technical meanings, such as repeater-DCI (R-DCI), repeater control information (RCI), and network-controlled repeater control information (NCI) may be used. The SCI refers to a control channel transmitted by the base station to control the NCR, and is an unknown signal from the point of view of the terminal, and may be recognized only by the base station and the NCR.

Figure 12:
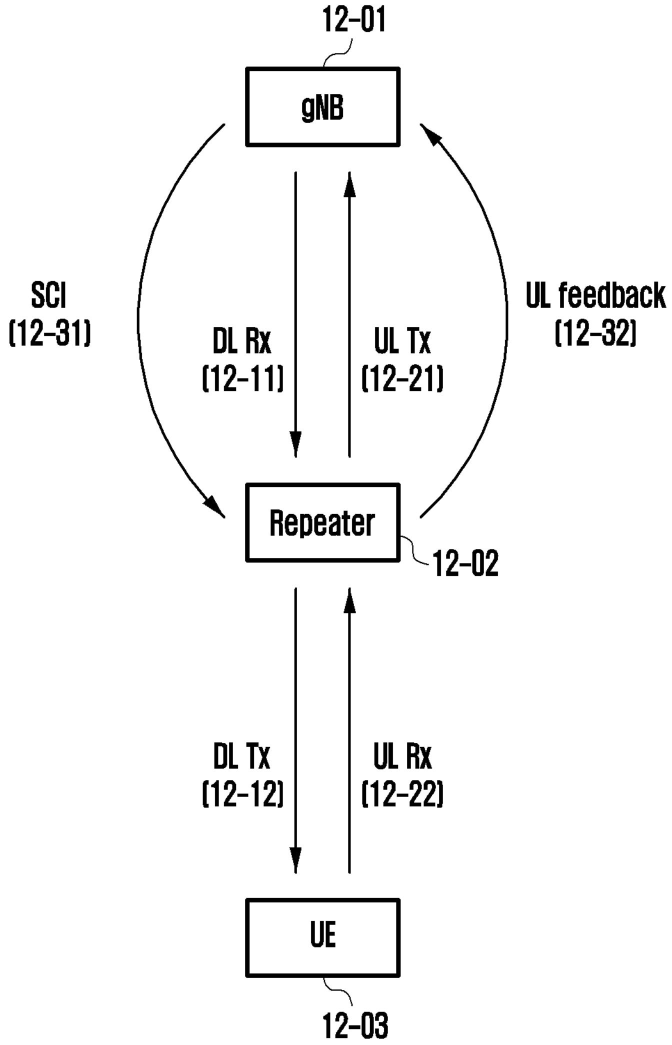
FIG. 12 illustrates an example of transmission and reception related to an NCR when NCR relays between a base station and a terminal according to an embodiment of the disclosure.

FIG. 12 illustrates an example of transmission and reception related to NCR when NCR relays between a base station and a UE according to an embodiment of the disclosure.

Referring to FIG. 12, an NCR 12-02 may relay communication (e.g., downlink, uplink) between the base station 12-01 and the UE 12-03. In the case of downlink, the NCR may receive a downlink signal sent from the base station (12-11), amplify and transmit the downlink signal to the UE (12-12). In this case, the NCR may detect an SCI configured to instruct the operation of the NCR from the base station (12-31). In the case of uplink, the NCR may receive an uplink signal sent from the UE (12-22), amplify and transmit the uplink signal to the base station (12-21). In this case, the NCR may transmit uplink feedback or SRS for SCI or higher layer control to the base station (12-32). Assuming that the NCR-MT part of the NCR is the same as that of a general terminal, it would be a reasonable assumption that the NCR itself transmits uplink feedback.

In downlink, the NCR may amplify and transmit a downlink signal to the UE while detecting SCI. The above operation may be possible when an SCI can be searched at the same time while performing an amplification and forwarding operation from the standpoint of the NCR. Because SCI search requires low complexity, NCR will be able to perform the above operation without additional cost. On the other hand, an operation in which the NCR transmits uplink feedback on its own in uplink and simultaneously amplifies and forwards the uplink signal of the UE may vary depending on the implementation of the NCR.

Figure 13:
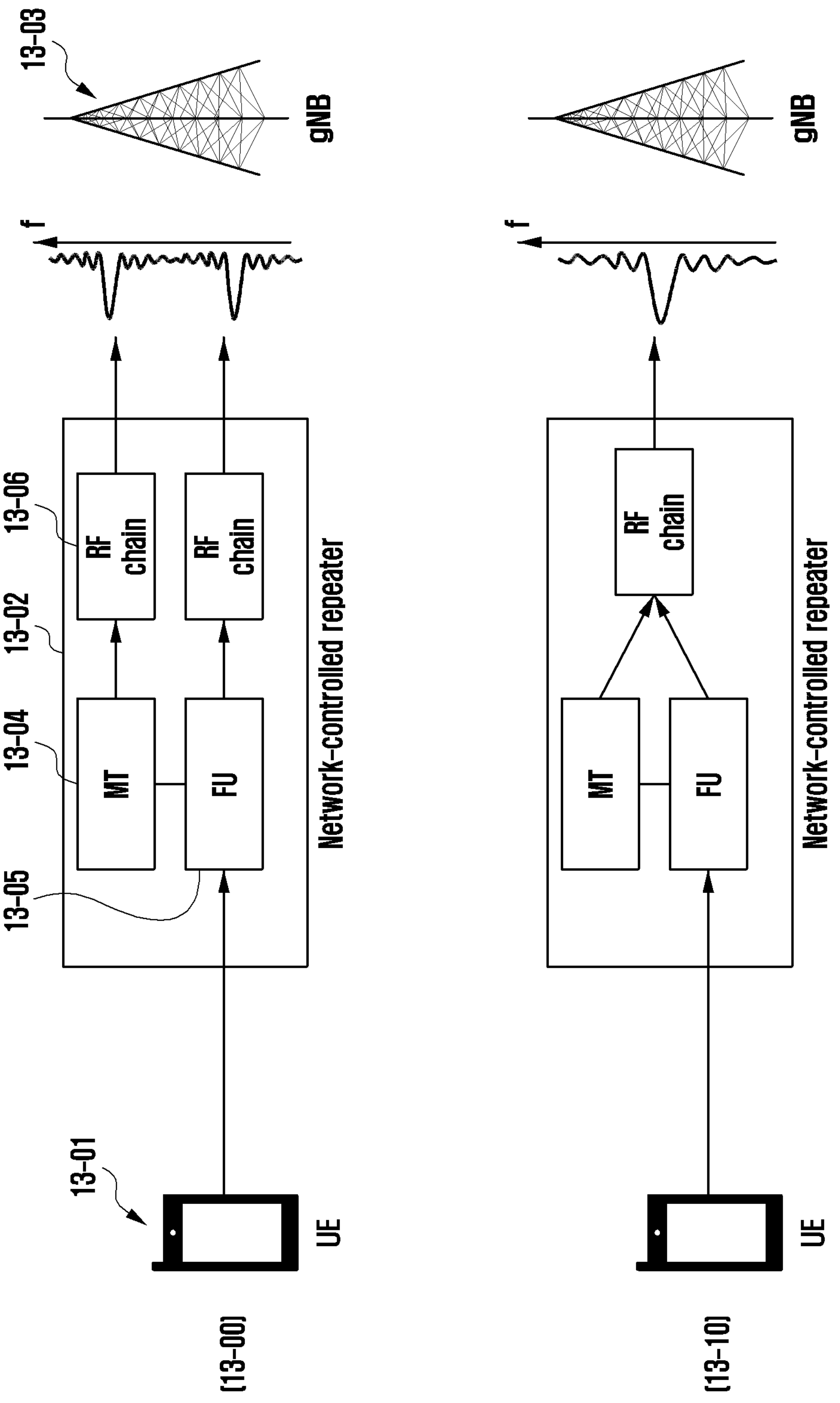
FIG. 13 illustrates an example of uplink transmission according to a radio frequency (RF) chain when an NCR relays between a base station and a terminal according to an embodiment of the disclosure.

FIG. 13 illustrates an example of uplink transmission according to an RF chain when an NCR relays between a base station and a UE according to an embodiment of the disclosure.

Referring to FIG. 13, a UE 13-01 may receive relay from an NCR 13-02 to transmit an uplink signal to a base station 13-03. 13-00 in FIG. 13 represents an example of a situation in which an NCR-MT 13-04 and an NCR-FU 13-05 are connected to different RF chains 13-06, respectively, and 13-10 represents an example of a situation where the NCR-MT and the NCR-FU are connected to the same RF chain. The RF chain is a functional configuration in which a single radio link and a series of RF processing elements (e.g., antennas, power amplifiers, mixers) are connected like a chain, and usually converts to an analog signal at the digital stage, then raises the frequency and sends the signal through several filters. In general, one RF chain is used for one stream. Therefore, in 13-00, because the signal transmitted by the UE and the signal transmitted by the NCR-MT in uplink are transmitted to the base station through different RF chains, the signals may be transmitted in different frequency domains within the same time. On the other hand, when the signal sent by the UE and the signal sent by the NCR-MT are viewed as different streams in 13-10, they cannot be transmitted simultaneously in the same RF chain. Therefore, in situation 13-10, the base station needs to instruct the NCR to transmit signals of the UE and the NCR-MT at different times. If there is no such instruction, NCR must support multiple terminals, and considering an environment in which multiple traffics such as eMBB and URLLC are dynamically managed in the NR system, a collision may occur because the signals of the UE and the NCR-MT are scheduled at the same time. In this case, it is necessary to define what kind of operation the NCR should perform.

As an embodiment of the disclosure, a method for preventing a collision data/signals of a network-controlled repeater with data/signals of a UE in an uplink slot will be described.

In the current NR system, a UE may be allocated resources periodically, semi-persistently, or dynamically for signal transmission and reception. The NCR may also be allocated resources periodically, semi-persistently, or dynamically, like the terminal. As described above, when the NCR uses one RF chain, a problem may occur in which the NCR amplifies and transmits the uplink signal of the UE and cannot transmit the NCR-MT signal at the same time. Because the NCR does not know which resource the relaying UE has been configured with, the resource of the NCR may be given priority automatically unless an instruction to cancel the resource allocated to the NCR is received. The cases in which the two signals collide can be seen as the four cases in Table 19.

Table 19 shows an example of a scenario in which the uplink data/signal of the UE and the uplink data/signal of the NCR-MT overlap.

TABLE 19

| | NCR-MT | UE |
|---|---|---|
| Case 1 | Dynamic | Dynamic |
| Case 2 | Periodic/Semi-Persistent | Dynamic |
| Case 3 | Dynamic | Periodic/Semi-Persistent |
| Case 4 | Periodic/Semi-Persistent | Periodic/Semi-Persistent |

In Table 19, Case 1 is a case where signals are dynamically scheduled for both the NCR-MT and the UE of the NCR, and may indicate a case where resources allocated to the NCR-MT and resources allocated to the UE overlap at least one symbol in the same slot among uplink slots. Since both the NCR-MT and the UE are dynamically scheduled signals, when the number of UEs relayed by the NCR is small, the probability of collision occurrence in time will be small. However, when the number of terminals relayed by the NCR is large and the stability and speed of the terminals should be guaranteed, collisions with signals from the NCR may occur. Therefore, in case 1, it can be seen that the signal of the UE is given priority, and it may be necessary to add an uplink cancellation operation instruction to the NCR.

Case 2 represents a case where a periodically/semi-persistently scheduled signal of NCR-MT of NCR and a dynamically scheduled signal of the UE collide in time. In this case, since the base station prioritizes the dynamic signal of the UE, it can be regarded as scheduling for the terminal, and it may be necessary to add an uplink cancellation operation instruction to the NCR.

Case 3 is a case where a dynamically scheduled signal of the NCR-MT of the NCR and a periodically/semi-persistently scheduled signal of the UE collide in time. In this case, the NCR-MT signal of the NCR may be given priority, and the NCR may transmit the NCR-MT signal without additional operation support.

Case 4 represents a case where a periodic/semi-persistently scheduled signal of the NCR-MT of NCR and a periodic/semi-persistently scheduled signal of the UE collide in time. In this case, when the base station gives priority to the signal of the terminal, it may be necessary to add an uplink cancellation operation instruction to the NCR.

In the proposed method and/or embodiment described below, cases 1, 2, and 4 among the four cases that can be referred to in Table 19 are assumed and described. Hereinafter, in the disclosure, a method for transmitting the NCR-MT signal of the NCR and the signal of the UE will be described for the above case.

Method 1: Dedicated Slot for Repeater UL Signal Transmission

For the Cases 1, 2, and 4, the NCR-MT of the NCR may be configured a slot for transmitting an uplink signal through higher layer signaling from the base station. In the disclosure, for convenience of description, the corresponding slot will be referred to as an "NCR dedicated slot". However, it is not limited to the terms described later in the disclosure, and other terms having equivalent technical meanings may be used. The NCR-dedicated slot may mean a slot in which the NCR does not perform amplification and forwarding operations for a signal transmitted by the UE and may be configured and transmit uplink signals of the NCR-MT of the NCR, for example, PUCCH, PUSCH, PRACH, and SRS. The NCR may not expect to be scheduled for an uplink signal of the NCR in a slot other than the NCR-dedicated slot.

Figure 14:
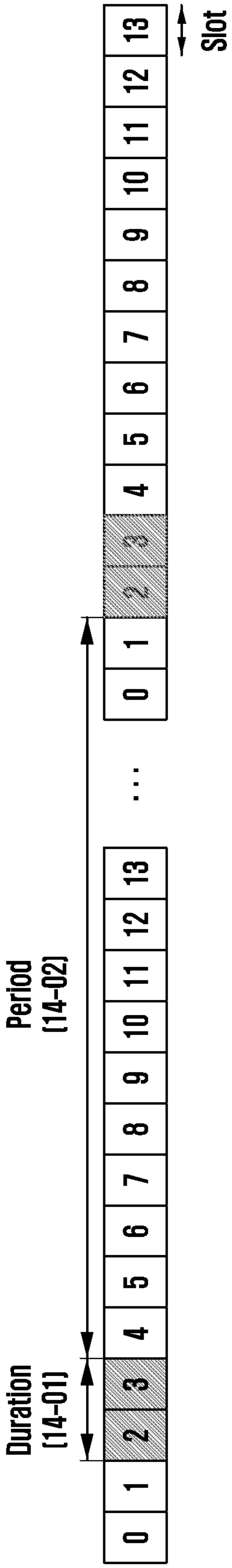
FIG. 14 illustrates an example of a case in which an NCR dedicated slot is configured by higher layer signaling according to an embodiment of the disclosure.

FIG. 14 illustrates an example of a case in which an NCR dedicated slot is configured by higher layer signaling according to an embodiment of the disclosure.

Referring to FIG. 14, a duration 14-01 and a period 14-02 of the NCR-dedicated slot may be configured by higher layer signaling. The NCR may obtain the above information in units of slots through higher layer parameters, for example, Duration and Period parameters configured below NCR-dedicated-slot. In addition, the duration of the configured period may be assumed to be a half frame.

The NCR may not assume NCR-dedicated slots under the following conditions:

- When the NCR-dedicated slot overlaps at least one symbol with SIB1 or SSB configured to ssb-PositionsInBurst of ServingCellConfigCommon,
- When the NCR-dedicated slot overlaps at least one symbol with the CORESET of the Type0-PDCCH CSS set configured to searchSpaceZero of pdcch-ConfigSIB1 or searchSpaceSIB1 of PDCCH-ConfigCommon in the MIB,
- When the downlink slot is configured with the higher layer parameter tdd-UL-DL-ConfigurationCommon or tdd-UL-DL-ConfigurationDedicated, and/or
- When the higher layer parameter SlotFormatIndicator is configured and the downlink slot is indicated in the SFI-index field of DCI format 2_0.

That is, the NCR may transmit uplink signals in the slots other than the slots satisfying the above conditions in the configured NCR-dedicated slots.

In this method 1, the NCR dedicated slot may be interpreted as an NCR transmission symbol or symbol set within the NCR dedicated slot. That is, the NCR may transmit an uplink signal of the NCR in some symbols or some symbol sets of NCR-dedicated slots. The NCR transmission symbol or a set of symbols in an NCR-dedicated slot may be expressed as an NCR-dedicated symbol or an NCR-dedicated symbol set.

In this method 1, the NCR transmission symbol (set) may be located in the time domain satisfying the following.

For example, as a first location, NCR transmission symbols (sets) may be located within flexible symbols. Here, the flexible symbol may be a flexible symbol configured according to tdd-UL-DL-ConfigurationCommon of SIB1 or ServingCellConfigurCommon. The base station may not schedule an uplink signal to the UE in the flexible symbol, and the base station may schedule the NCR to transmit the uplink signal of the NCR in the flexible symbol. For example, when there are a plurality of consecutive flexible symbols, the last symbols among the flexible symbols may be determined as NCR transmission symbols (sets). That is, it can be assumed that a flexible symbol cannot come right after the NCR transmission symbol (set) in NCR.

As another example, as a second position, the NCR transmission symbol (set) may be an uplink symbol or symbol set right after the flexible symbol. That is, it may be configured in the order of flexible symbol—NCR transmission symbol (set)—uplink symbol. In this case, the UE may not receive scheduling of an uplink signal in an uplink symbol immediately following the flexible symbol, and may use the symbols as an RX-to-TX switching time.

For another example, as a third position, the NCR transmission symbol (set) may be an uplink symbol or a symbol set right before the downlink symbol. That is, it may be configured in the order of uplink symbol—NCR transmission symbol (set)—downlink symbol. In this case, the UE may not receive scheduling of an uplink signal in an uplink symbol immediately preceding a downlink symbol, and may use the symbols as a TX-to-RX switching time.

In the method 1, the NCR is configured with a dedicated NCR slot and symbol (set) from the base station, and uplink transmission of the NCR is permitted according to the configuration. This may be selectively used according to the channel/signal transmitted by the NCR.

More specifically, the NCR may receive periodic uplink transmission configuration from the base station through higher layer signaling. For example, the NCR may be configured with periodic PUSCH (or grant-free PUSCH), periodic PUCCH (or HARQ-ACK transmission of SPS PDSCH, SR transmission, periodic CSI measurement transmission, etc.), periodic SRS transmission. Transmission of a periodic signal configured through higher layer signaling may be possible in the NCR-dedicated slot or symbol (set). That is, when the periodic signal of the higher layer is included in the NCR-dedicated slot, symbol (set), the NCR may transmit the periodic signal of the higher layer, but otherwise, some or all of the periodic signals configured to the higher layer may not transmit.

In the case of periodic PUSCH (or grant-free PUSCH) and periodic PUCCH (or HARQ-ACK transmission of SPS PDSCH, SR transmission, Periodic CSI measurement transmission, etc.) within one slot, when the NCR-dedicated slot and symbol (set) do not include even one symbol of periodic PUCCH/periodic PUSCH, the periodic PUSCH and periodic PUCCH in the slot may not be transmitted.

In the case of periodic SRS within one slot, when even one symbol is not included in the NCR dedicated slot, symbol (set), SRS is not transmitted in symbols not included in the slot, but SRS may be transmitted in symbols included.

More specifically, the NCR may be indicated to transmit an uplink channel/signal through a PDCCH (or DCI format) from the base station. In this case, the NCR may transmit the uplink channel/signal indicated on the PDCCH as instructed by the base station. In this case, the NCR may be transmitted in uplink regardless of the preceding NCR dedicated slot or symbol (set). However, when the indicated uplink channel/signal overlaps with a downlink symbol, the uplink channel/signal may not be transmitted on the symbol.

Here, the downlink symbols may include SSB symbols configured in SIB 1 or ssb-PositionsInBurst of ServingCellConfigCommon and downlink symbols configured in tdd-UL-DL-ConfigurationCommon to tdd-UL-DL-ConfigurationDedicated.

Method 2: Two-Step UL Signal Cancelling and Retransmitting

For the Cases 1, 2, and 4, the NCR may receive instructions from the base station to cancel an uplink signal to be transmitted in two steps, and retransmit the canceled uplink signal. The first step is an operation in which the NCR receives an instruction to cancel the scheduled uplink signal of the NCR from the base station and cancels the same, and the second step is an operation in which the NCR performs retransmission.

As the first step, the NCR may receive a UL cancellation indication (UL CI) in DCI format 2_4 for uplink signals to be transmitted, for example, PUCCH, PUSCH, and SRS, and the NCR may cancel the uplink signal based on the UL CI. In the existing UL CI, when the HARQ-ACK contained in the PUCCH of an eMBB UE is canceled, many PDSCHs should be retransmitted due to the nature of eMBB traffic, so PUCCH cancellation is excluded. However, since NCR has a small amount of data transmission unlike eMBB UEs, it may be reasonable to support PUCCH cancellation. A PUCCH may be newly included in a signal capable of canceling an existing UL CI, and an operation of canceling an uplink signal based on the UL CI may be performed according to an existing method.

As the second step, the retransmission operation after the cancellation operation may be divided differently depending on the case.

In the case of Case 1, the dynamic uplink signal of NCR may include PUCCH, PUSCH, or SRS including HARQ-ACK information. In this case, since the SRS has a low priority, the base station may additionally instruct SRS transmission later. On the other hand, HARQ-ACK information may have an important meaning when a base station operates NCR. For example, when NCR is based on the symbol of PUCCH containing HARQ-ACK information corresponding to SCI reception or the symbol of PUCCH containing HARQ-ACK information corresponding to PDSCH reception containing MAC-CE information in beam operation, it can be seen as an important operation for the NCR to send HARQ-ACK information to the base station. Therefore, the base station may instruct the NCR to retransmit HARQ-ACK information, and the retransmission of HARQ-ACK information may be performed according to the operation of the existing HARQ-ACK codebook retransmission.

In cases 2 and 4, the periodic/semi-persistent uplink signal of NCR may include PUCCH or PUSCH and SRS including HARQ-ACK information, scheduling request, or CSI-report corresponding to SPS PDSCH reception. The periodic/semi-persistent uplink signal of NCR may be retransmitted in the next cycle even if the base station does not additionally instruct retransmission. Exceptionally, the PUCCH including HARQ-ACK information corresponding to SPS PDSCH reception may be transmitted in the nearest uplink slot after cancellation by applying the HARQ-ACK delay operation for the existing SPS PDSCH.

Method 3: One-Step UL Signal Cancelling and Retransmitting

In general, when an NCR relays between a base station and a plurality of terminals, it is necessary to perform relaying by applying different beams in time to the plurality of terminals. In this case, the NCR may detect DCI for scheduling a PDSCH including SCI or MAC-CE for beam adjustment in downlink. As feedback for signaling, the NCR may transmit a PUCCH including HARQ-ACK information for SCI or PDSCH to the base station. In addition, since a plurality of terminals send data or feedback information in uplink, the probability that the NCR-MT signal of the NCR and the signal of the UE overlap in the time domain may increase. When a collision between the NCR-MT signal of the NCR and the signal of the UE occurs and Method 2 is applied, the base station should transmit SCI (or DCI) twice to the NCR in order to cancel and retransmit the NCR-MT signal of the NCR.

However, in Case 1, there is a high probability that cancellation and retransmission occur consecutively. The reason is that, as described above, more cases of detecting a DCI scheduling a PDSCH including an SCI or MAC-CE occur when the NCR relays the UE. Therefore, if cancellation and retransmission occur consecutively, as in Method 2, the base station instructing both cancellation and retransmission with one SCI rather than instructing each step with different SCI (or DCI) may bring about an effect of reducing the burden on the base station's NCR operation. Hereinafter, in Method 3 of the disclosure, an operation of instructing both cancellation and retransmission of an uplink signal of an NCR with one SCI will be described.

As an example of Method 3, an example of canceling and retransmitting HARQ-ACK information of Case 1 will be mainly described, but the scope of the disclosure is not limited thereto and may be applied to Cases 2 and 4.

Since the base station operates a plurality of NCRs and the number of relaying terminals and traffic are different according to each NCR, it is necessary to drop SCI according to the situation of the NCR. Therefore, it would be more reasonable for the SCI indicating cancellation and retransmission to be indicated as UE-specific or repeater-specific rather than giving information down to all NCRs in a group common manner. NCR may expect/perform the following series of operations.

Operation 1. When the NCR is configured for one-step cancellation and retransmission by higher layer signaling (e.g., RRC) (e.g., onestep-UL-CI-Re), the NCR may be configured a search space set in which the NCR detects SCI scrambled with C-RNTI or MCS-RNTI. When the higher layer signaling is configured and the field indicating one-step cancellation and retransmission of the detected SCI, for example, the UL-CI-Re field is '1', the NCR may be indicated time region to cancel the uplink signal of the NCR-MT. For example, the duration of the time region to be canceled may be configured in symbol units in a higher layer parameter. In addition, the start symbol of the time region to be canceled may start after Tproc than the last symbol of the PDCCH providing the detected SCI. The Tproc may mean the minimum time required for the NCR to decode the PDCCH. For example, Tproc may be configured in symbol units, and the Tproc value may be determined based on repeater capability. When the time region for canceling uplink with SCI and the scheduled PUCCH or PUSCH overlap by at least one symbol, the NCR may not transmit the PUCCH or PUSCH to the base station.

Operation 2. After the NCR detects SCI in slot n and performs operation 1 (e.g., cancellation of uplink transmission) in slot m, the NCR may retransmit PUCCH or PUSCH including canceled HARQ-ACK information in slot n+k. The slot n+k may be located after slot m.

Figure 15:
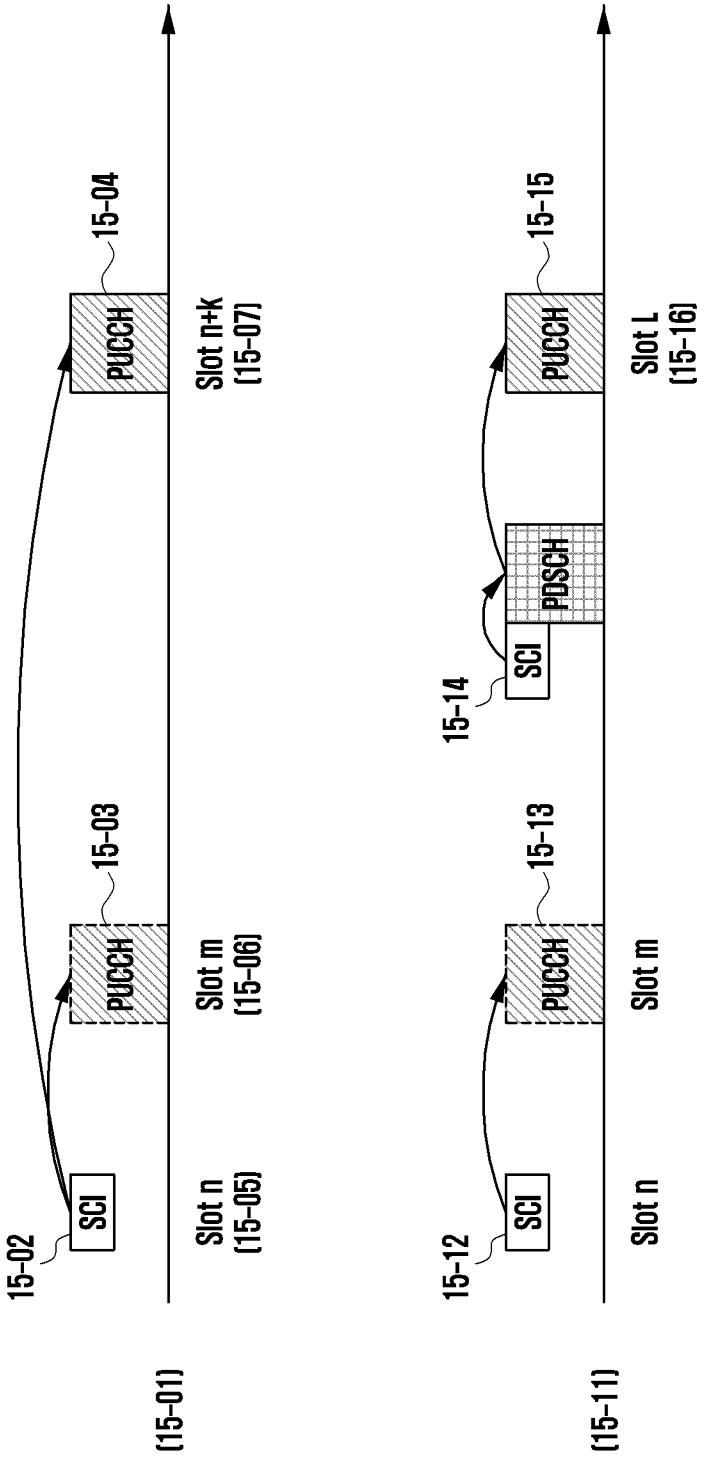
FIG. 15 illustrates examples of operations 2-1 and 2-2 in Method 3 according to an embodiment of the disclosure.

FIG. 15 illustrates an example of operations of canceling and retransmitting uplink transmission of the NCR according to an embodiment of the disclosure.

Referring to FIG. 15, operation 2 of the NCR in Method 3 will be described in detail. The NCR may expect one of operation 2-1 (15-01) and operation 2-2 (15-11).

Operation 2-1. Referring to 15-01 of FIG. 15, the NCR may detect SCI 15-02 whose field indicating one-step cancellation and retransmission is '1' in slot n 15-05, and drop PUCCH 15-03 in slot m 15-06. After that, the NCR may retransmit PUCCH 15-04 in slot n+k 15-07. In this case, k may be configured in units of symbols or slots by a filed value of SCI.

Operation 2-2. Referring to 15-11 of FIG. 15, the NCR may detect an SCI 15-12 whose field indicating one-step cancellation and retransmission is '1' in slot n and drop the PUCCH 15-13 in slot m. In this case, the NCR may assume that the slot of the PUCCH to be retransmitted is a 'non-numerical value'. The NCR may detect DCI or SCI 15-14 scheduling PDSCH after slot m, and multiplex and transmit HARQ-ACK information of canceled PUCCH 15-13 to PUCCH 15-15 when DCI or SCI indicates PUCCH resource as 'applicable value' in slot L 15-16.

Operation 3. The NCR may perform an operation to cancel the uplink signal in operation 1, determine a time resource for retransmission in operation 2, and then perform operation 3 (e.g., retransmission). In operation 3, the NCR may expect one of the following operations.

Operation 3-1. Not only HARQ-ACK information but also other UCI types (e.g., scheduling request, CSI-report) may be included in the retransmitted PUCCHs 15-04 and 15-15.

Operation 3-2. Only HARQ-ACK information may be included in the retransmitted PUCCHs 15-04 and 15-15 and retransmitted. Other UCI types that are not included (e.g., Scheduling request, CSI-report) may be dropped.

Operation 4. When a time-frequency region for canceling uplink with SCI in a slot where retransmission is to be performed overlaps at least one symbol with PUCCH or PUSCH, NCR may expect one of the following operations.

Operation 4-1. The NCR may drop a PUCCH or PUSCH overlapping at least one symbol with a time-frequency region without further retransmission.

Operation 4-2. When the 'current number of retransmission operations' is less than the 'maximum number of retransmission operations' C, the NCR may start over from operation 1 and add 1 to the 'current retransmission count'. 'Maximum number of retransmission operations' C may be configured by higher layer signaling. When the 'current number of retransmission operations' exceeds the 'maximum number of retransmission operations' C, the NCR may drop the PUCCH or PUSCH without further retransmission.

Operation 4-3. Starting with the last symbol of the PDCCH providing the SCI initially indicating cancellation and retransmission, the maximum deferring window may be configured in units of symbols or slots through higher layer signaling. When the PUCCH or PUSCH corresponding to operation 4 is within the maximum delay window, operation 1 may be resumed.

Next, configuration of a flexible symbol of NCR according to an embodiment of the disclosure will be described.

In the 5G communication system, the legacy UE may be instructed to dynamically change the downlink signal transmission period and the uplink signal transmission period. To this end, the base station may indicate to the UE whether each of the OFDM symbols constituting one slot is a downlink symbol, an uplink symbol, or a flexible symbol through a slot format indicator (SFI). Here, the flexible symbol may refer to a symbol that is not both a downlink and an uplink symbol, or a symbol that can be changed to a downlink or uplink symbol by UE-specific control information or scheduling information. In this case, the flexible symbol may include a gap guard required in a process of switching from downlink to uplink.

The UE receiving the slot format indicator may receive a downlink signal from the base station in the symbol indicated by the downlink symbol, and transmit an uplink signal to the base station in the symbol indicated by the uplink symbol. For a symbol indicated as a flexible symbol, the UE may perform at least a PDCCH monitoring operation, and receive a downlink signal from the base station (e.g., when DCI format 1_0 or 1_1 is received) through another indicator, for example, DCI, or transmit an uplink signal to the base station (e.g., when DCI format 0_0 or 0_1 is received) in the flexible symbol.

Referring to FIG. 11, in a first step, cell-specific configuration information 1110 for configuring uplink-downlink in a semi-static manner may be configured. For example, uplink-downlink of a symbol/slot may be configured through system information such as SIB. Specifically, the cell-specific uplink-downlink configuration information 1110 in the system information may include uplink-downlink pattern information and information indicating a reference subcarrier interval. The uplink-downlink pattern information may indicate transmission periodicity 1103 of each pattern, the number of consecutive full DL slots at the beginning of each DL-UL pattern 1111, the number of consecutive DL symbols in the beginning of the slot following the last full DL slot 1112, the number of consecutive full UL slots at the end of each DL-UL pattern 1113 and the number of symbols in the previous slot (number of consecutive UL symbols in the end of the slot preceding the first full UL slot) 1114. In this case, the UE may determine slots/symbols not indicated as uplink or downlink as flexible slots/symbols.

As a second step, the UE-specific configuration information 1120 transmitted through UE-specific higher layer signaling (e.g., RRC signaling) may indicate symbols to be configured for downlink or uplink within flexible slots or slots 1121 and 1122 including flexible symbols. For example, the UE-specific uplink-downlink configuration information 1120 may include a slot index indicating slots 1121 and 1122 containing flexible symbols, the number of consecutive DL symbols in the beginning of the slot (1123, 1125), and the number of consecutive UL symbols in the end of the slot (1124, 1126), or may include information indicating the entire downlink or information indicating the entire uplink, for each slot. In this case, the symbol/slot configured to uplink or downlink through the cell specific configuration information 1110 of the first step cannot be changed to downlink or uplink through UE-specific higher layer signaling 1120.

As a third step, in order to dynamically change the downlink signal transmission period and the uplink signal transmission period, the downlink control information of the downlink control channel may include a slot format indicator 1130 indicating whether each symbol is a downlink symbol, an uplink symbol, or a flexible symbol in each slot among a plurality of slots starting from the slot in which the UE detected the downlink control information. In this case, for the symbols/slots configured to uplink or downlink in the first and second steps, the slot format indicator may not indicate that they are downlink or uplink. In the first and second steps, the slot format of each slot 1131 or 1132 including at least one symbol not configured to uplink or downlink may be indicated by corresponding downlink control information.

As described above, the UE can know whether each symbol is a downlink symbol, an uplink symbol, or a flexible symbol through higher layer signaling or a slot format indicator. The UE may use uplink or downlink in a flexible symbol according to the instruction of the base station, and a gap period may be necessary in a process of switching from downlink to uplink.

The NCR may also be configured for uplink and downlink like existing terminals, and may be dynamically instructed in some cases. The NCR may perform an operation of receiving a signal from a base station and amplifying and forwarding the signal to the UE in the downlink, and performing an operation of receiving a signal from the UE and amplifying and forwarding the signal to the base station in the opposite direction in the uplink. However, while NCR is expected to operate clearly for uplink and downlink symbols, NCR's operation for flexible symbols is not clear.

Figure 16:
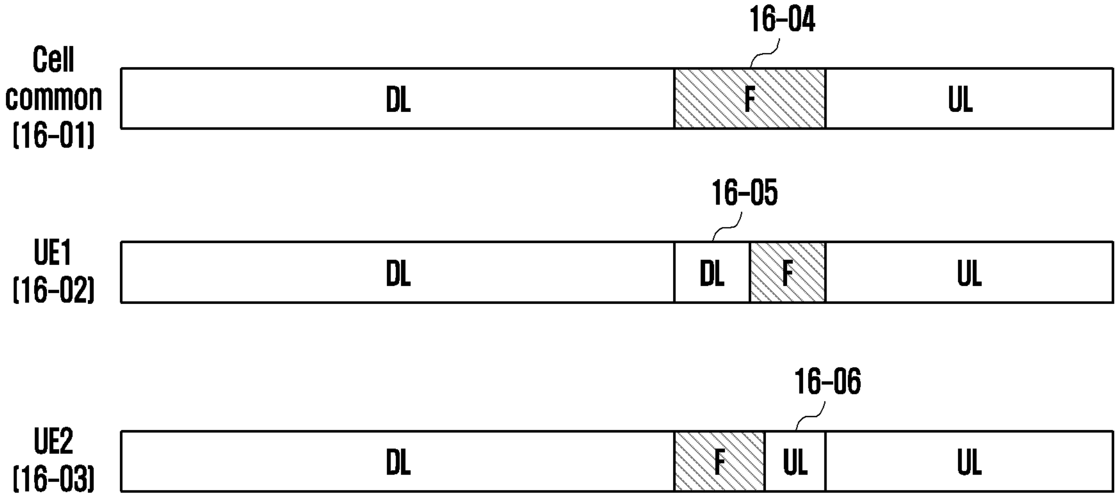
FIG. 16 illustrates an example of uplink-downlink configuration of an NCR according to an embodiment of the disclosure.

FIG. 16 illustrates an example of uplink-downlink configuration of the NCR according to an embodiment of the disclosure.

Referring to FIG. 16, in a state in which the NCR is configured for uplink and downlink with a cell common signal 16-01, UE 1 16-02 and UE 2 16-03 may be instructed with a slot format indicator through terminal-specific configurations. UE 1 and UE 2 are respectively instructed to use downlink 16-05 and uplink 16-06 in a terminal-specific manner in a flexible symbol zone 16-04 set commonly for the cell. In this case, the NCR should perform a downlink operation on the symbol corresponding to 16-05 and an uplink operation on the symbol corresponding to 16-06. However, from the point of view of the NCR, since the UE-specific configuration is not known, it is not known until when the downlink operation is performed and when the uplink is switched. In other words, from the viewpoint of the NCR, if there is no additional configuration or instruction in the flexible symbol 16-04, the downlink/uplink switching timing may not be clear.

In order to provide a clear switching time point for flexible symbols of the NCR, the base station may configure a switching time point in units of symbols through higher layer signaling to the NCR.

Figure 17:
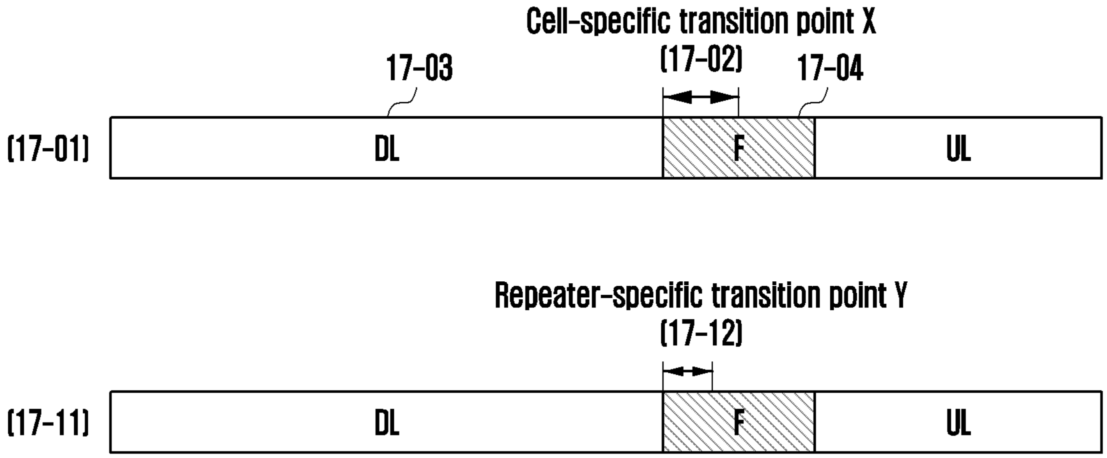
FIG. 17 illustrates an example of configuring a downlink-uplink switching time point of NCR according to an embodiment of the disclosure.

FIG. 17 illustrates an example of configuring a downlink-uplink switching time point of NCR according to an embodiment of the disclosure.

Referring to FIG. 17, when the NCR is configured with a switching time point by higher layer signaling, the NCR may configure the transition time with a cell-specific signal 17-01 or a repeater-specific signal 17-11. For example, in the case of 17-01, the NCR may be configured as much as X symbols 17-02 as a cell specific signal (for example, SIB1), and the NCR can be expected to switch to uplink after X symbols from the last symbol configured as downlink 17-03. That is, for the NCR, X symbols from the last symbol configured as downlink may be assumed to be downlink, and subsequent symbols may be assumed to be uplink. For example, in the case of 17-11, NCR may be configured as much as Y symbols 17-12 as a repeater-specific signal (e.g., RRC), and the NCR may be expected to switch to uplink after Y symbol from the last symbol configured as downlink.

For example, when a switch point is configured with a cell-specific signal and a switch point is configured with a repeater-specific signal, the NCR may follow the switch point of the repeater-specific signal.

When the NCR has not received a transition time point or when the configured number of X or Y symbols is greater than the configured number of flexible symbols 17-04, the NCR may perform the following operations for the transition time point:

- switching from downlink to uplink in the first symbol after the last symbol of the configured downlink,
- switching from downlink to uplink in the last symbol before the first symbol of the configured uplink, or
- Assuming that the number of configured flexible symbols is A, switching from downlink to uplink at ceil (A/2) or floor (A/2) symbols after the last symbol of the configured downlink.

When the NCR is configured to switch to higher layer signaling, the transition time may be configured with a cell-specific signal, or the transition point may be configured with a repeater-specific signal. For example, the NCR may be configured as much as X' symbols as a cell-specific signal (for example, SIB1), and the NCR may expect reception in downlink from the first symbol configured to uplink to before X' symbols. That is, the NCR may assume that symbols prior to X' symbols from the first symbol configured as uplink are downlink. For example, NCR may be configured as many as Y' symbols as a repeater-specific signal (e.g., RRC), and NCR may expect reception in downlink from the first symbol configured to uplink to before Y' symbol. For example, when a switch point is configured with a cell-specific signal and a switch point is configured with a repeater-specific signal, the NCR may follow the switch point of the repeater-specific signal.

For example, when a switch point is configured with a cell-specific signal and a switch point is configured with a repeater-specific signal, the NCR may follow the switch point of the repeater-specific signal.

When the NCR is not configured a transition time point, or when the configured number of X' or Y' symbols is greater than the configured number of flexible symbols, the NCR may perform the following operations for the transition time point:

- switching from downlink to uplink in the first symbol after the last symbol of the configured downlink,
- switching from downlink to uplink in the last symbol before the first symbol of the configured uplink, or
- Assuming that the number of configured flexible symbols is A, switching from downlink to uplink at ceil (A/2) or floor (A/2) symbols after the last symbol of the configured downlink.

Figure 18:
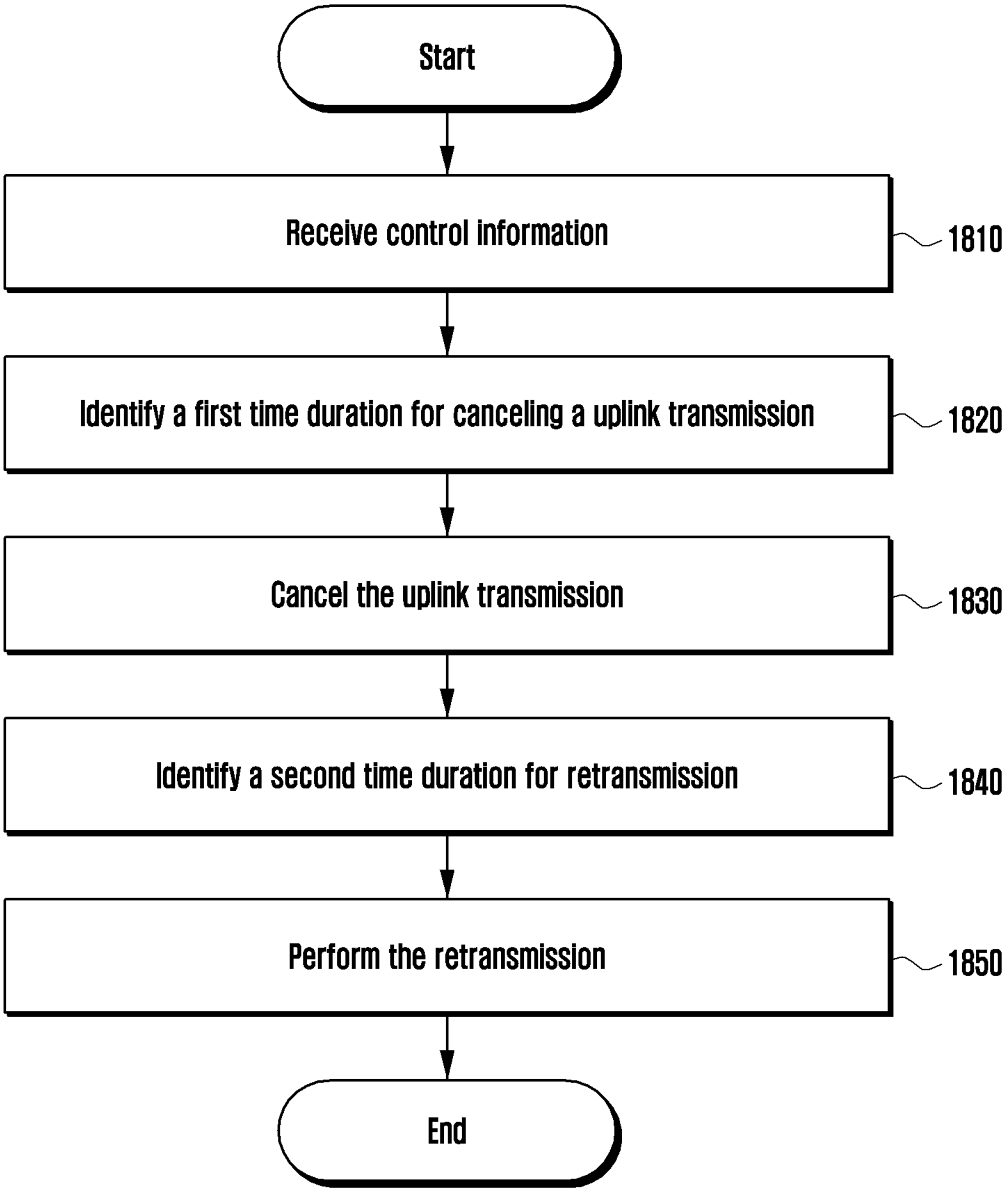
FIG. 18 illustrates a flowchart of operations of NCR according to an embodiment of the disclosure.

FIG. 18 illustrates a flowchart of operations of NCR according to an embodiment of the disclosure.

The operations of FIG. 18 may be performed based on the embodiments and/or methods described herein. Some operations of FIG. 18 may be omitted in some cases, and two or more operations may be combined and performed as one operation. Also, the operation order of FIG. 18 may be changed.

In operation 1810, the NCR may receive control information (e.g., SCI or DCI) from a base station. For example, the control information may include information associated with cancellation and retransmission of uplink transmission by NCR. For example, uplink transmission of NCR may include PUCCH transmission or PUSCH transmission.

In operation 1820, the NCR may identify a first time duration for cancellation of the uplink transmission based on the control information. The first time duration may start after a specific time (e.g., Tproc) from the last symbol of the PDCCH including the control information.

In operation 1830, the NCR may cancel uplink transmission within the first time duration. For example, in case that at least one symbol overlaps between the first time duration and the PUSCH or PUCCH of the NCR, the NCR may not transmit the PUSCH or PUCCH to the base station.

In operation 1840, the NCR may identify a second time duration for retransmitting the canceled uplink transmission. For example, when the second time duration is in units of slots, a slot in which retransmission is performed may be determined by a slot in which the control information is received and a value configured by a field included in the control information.

In operation 1850, the NCR may perform retransmission of the uplink transmission based on the second time duration. For example, the canceled PUSCH or PUCCH may be retransmitted. The PUCCH or PUSCH may include HARQ-ACK information corresponding to the control information or HARQ-ACK information corresponding to reception of a PDSCH containing MAC-CE information, and a scheduling request or CSI report may be excluded from retransmission. Alternatively, the PUCCH or PUSCH may include both HARQ-ACK information and a scheduling request or CSI report. Additionally, the retransmission may be performed according to whether the current number of retransmission operations exceeds the maximum number of retransmission operations.

Although not shown in FIG. 18, the NCR may receive information on the maximum deferring window from the base station. Further, the NCR may receive second control information indicating a cancellation and a retransmission of the retransmission indicated by the control information. The NCR may identify a third time duration for canceling the retransmission. In this case, if the second time duration for the retransmission overlaps with the third time duration for the cancellation of the retransmission within the maximum deferring window, the NCR may perform operations for the retransmission (i.e., the retransmission may be performed). The NCR may receive information on dedicated time resources for uplink transmission of the NCR from the base station. The configuration of the dedicated time resources may be based on Method 1 described above. For example, the dedicated time resources may be configured within flexible symbols configured for the UE.

Although not shown in FIG. 18, the NCR may receive information on a switching time between uplink and downlink from the base station. Based on the information, the NCR may perform uplink transmission or downlink transmission by identifying the switching time from uplink to downlink or from downlink to uplink.

Figure 19:
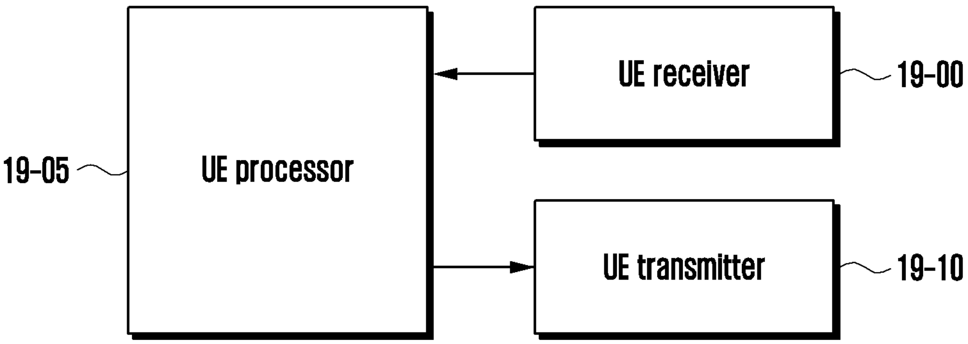
FIG. 19 is a view illustrating a terminal structure in a wireless communication system according to an embodiment of the disclosure.
Figure 20:
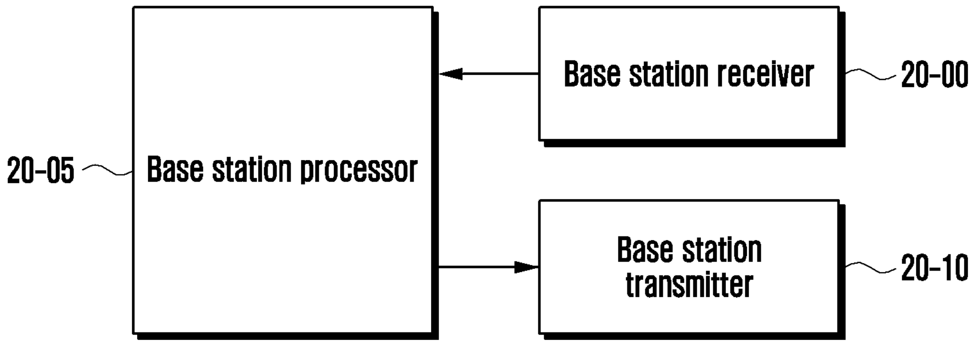
FIG. 20 is a view illustrating a structure of a base station in a wireless communication system according to an embodiment of the disclosure.

The above-described embodiments and/or methods may be performed by the terminal/base station/NCR of FIGS. 19 and 20.

FIG. 19 illustrates a structure of a UE in a wireless communication system according to an embodiment of the disclosure.

Referring to FIG. 19, the UE may include a UE receiver 19-00, a UE transmitter 19-10, and a UE processor (a controller) 19-05.

For example, since the NCR relaying between the UE and the base station as described above looks like a UE from the point of view of the base station, in this case, the UE of FIG. 19 may be an NCR. For example, the NCR may include a receiver, a transmitter, and a processor (controller).

The UE receiver 19-00 and the UE transmitter 19-10 may be collectively called a transceiver. According to the communication method of the UE described above, the UE receiver 19-00, the UE transmitter 19-10, and the UE processor 19-05 of the UE may operate. However, the elements of the UE are not limited to the above-described examples. For example, the UE may include more or fewer elements (e.g., a memory and the like) than the aforementioned elements. In addition, the UE receiver 19-00, the UE transmitter 19-10, and the UE processor 19-05 may be implemented in the form of a single chip.

The UE receiver 19-00 and the UE transmitter 19-10 (or transceiver) may transmit or receive a signal to or from a base station. Here, the signal may include control information and data. To this end, the transceiver may include an RF transmitter for up-converting and amplifying a frequency of a transmitted signal, an RF receiver for low-noise amplifying and down-converting a received signal, and the like. However, this is only an embodiment of the transceiver, and the elements of the transceiver are not limited to the RF transmitter and the RF receiver.

In addition, the transceiver may receive a signal through a wireless channel and output the received signal to the UE processor 19-05, and may transmit a signal, which is output from the UE processor 19-05, through a wireless channel.

The memory (not shown) may store programs and data necessary for the operation of the UE. In addition, the memory may store control information or data included in a signal acquired by the UE. The memory may be configured as a storage medium, such as read only memory (ROM), random access memory (RAM), hard disk, compact disc (CD)-ROM, and digital versatile disc (DVD) or a combination of storage media.

The UE processor 19-05 may control a series of processes so that the UE may operate according to the above-described embodiment. The UE processor 19-05 may be implemented as a controller or one or more processors.

FIG. 20 illustrates a structure of a base station in a wireless communication system according to an embodiment of the disclosure.

Referring to FIG. 20, the base station may include a base station receiver 20-00, a base station transmitter 20-10, and a base station processor (a controller) 20-05.

For example, since the NCR relaying between the UE and the base station as described above looks like a base station from the viewpoint of the terminal, in this case, the base station of FIG. 20 may be the NCR. For example, the NCR may include a receiver, a transmitter, and a processor (controller).

The base station receiver 20-00 and the base station transmitter 20-10 may be collectively called a transceiver. According to the communication method of the base station described above, the base station receiver 20-00, the base station transmitter 20-10, and the base station processor 20-05 of the base station may operate. However, the elements of the base station are not limited to the above-described examples. For example, the base station may include more or fewer elements (e.g., a memory and the like) than the aforementioned elements. In addition, the base station receiver 20-00, the base station transmitter 20-10, and the base station processor 20-05 may be implemented in the form of a single chip.

The base station receiver 20-00 and the base station transmitter 20-10 (or transceiver) may transmit or receive a signal to or from the UE. Here, the signal may include control information and data. To this end, the transceiver may include an RF transmitter for up-converting and amplifying a frequency of a transmitted signal, an RF receiver for low-noise amplifying and down-converting a received signal, and the like. However, this is only an embodiment of the transceiver, and the elements of the transceiver are not limited to the RF transmitter and the RF receiver.

In addition, the transceiver may receive a signal through a wireless channel and output the received signal to the base station processor 20-05, and may transmit a signal, which is output from the base station processor 20-05, through a wireless channel.

The memory (not shown) may store programs and data necessary for the operation of the base station. In addition, the memory may store control information or data included in a signal acquired by the base station. The memory may be configured as a storage medium, such as ROM, RAM, hard disk, CD-ROM, and DVD or a combination of storage media.

The base station processor 20-05 may control a series of processes so that the base station may operate according to the above-described embodiment. The base station processor 20-05 may be implemented as a controller or one or more processors.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Further, although not set forth in the disclosure, methods which use separate tables or information including at least one element contained in the tables proposed in the disclosure are also possible.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network controlled repeater (NCR) in a wireless communication system, the method comprising:

receiving, from a base station, control information including (i) first information indicating both a cancellation and a retransmission of an uplink transmission of the NCR and (ii) second information associated with a slot for the retransmission of the uplink transmission of the NCR;

identifying a first time duration for the cancellation of the uplink transmission based on the control information;

in response to a physical uplink control channel (PUCCH) of the NCR overlapping with at least one symbol of the first time duration, canceling a transmission of the PUCCH within the first time duration;

identifying a second time duration for a retransmission of the PUCCH which is canceled within the first time duration based on the second information; and performing the retransmission of the PUCCH based on the second time duration, wherein, in case that the PUCCH which is canceled within the first time duration includes hybrid automatic repeat request-acknowledgment (HARQ-ACK) information corresponding to the control information and at least one of a scheduling request or a channel state information (CSI) report, the retransmitted PUCCH only includes the HARQ-ACK information corresponding to the control information, and the scheduling request and the CSI report are dropped.

2. The method of claim 1, further comprising:

identifying that a slot in which the retransmission of the PUCCH is to be performed overlaps with a time duration for a cancellation of the retransmission by at least one symbol;

identifying whether a number of retransmissions of the PUCCH exceeds a maximum number of retransmissions configured by higher layer signaling; and dropping the retransmission of the PUCCH in case that the number of retransmissions of the PUCCH exceeds the maximum number of retransmissions.

3. The method of claim 1, wherein the first time duration starts after a predefined threshold from a last symbol in which the control information is received, the predefined threshold depending on a capability of the NCR, and wherein the second time duration is a slot determined based on a slot in which the control information is received and a value configured by the second information.

4. The method of claim 1, further comprising:

receiving, from the base station, information on a maximum deferring window which starts from a last symbol in which the control information is received;

receiving, from the base station, second control information including information indicating a cancellation and a retransmission of the retransmission indicated by the control information; and identifying a third time duration for the cancellation of the retransmission based on the second control information, wherein, in case that the second time duration overlaps with the third time duration within the maximum deferring window, the retransmission of the PUCCH is performed.

5. The method of claim 1, further comprising:

receiving, from the base station, information on a dedicated time resource for the uplink transmission of the NCR, wherein the dedicated time resource is configured within flexible symbols for a terminal.

6. The method of claim 1, further comprising:

receiving, from the base station, information on a switching time between an uplink and a downlink, wherein the uplink transmission of the NCR overlaps with an uplink transmission of a user equipment (UE) communicating with the base station via the NCR.

7. A method performed by a base station in a wireless communication system, the method comprising:

transmitting, to a network controlled repeater (NCR), information configuring a first time duration for a cancellation of an uplink transmission of the NCR;

transmitting, to the NCR, control information including (i) first information indicating both the cancellation and a retransmission of the uplink transmission of the NCR and (ii) second information associated with a slot for the retransmission of the uplink transmission of the NCR; and receiving, from the NCR, a physical uplink control channel (PUCCH) that is canceled within the first time duration and retransmitted within a second time duration, the second time duration for a retransmission of the PUCCH being based on the second information, wherein, in response to the PUCCH of the NCR overlapping with at least one symbol of the first time duration, a transmission of the PUCCH is canceled within the first time duration, and wherein, in case that the PUCCH which is canceled within the first time duration includes hybrid automatic repeat request-acknowledgment (HARQ-ACK) information corresponding to the control information and at least one of a scheduling request or a channel state information (CSI) report, the retransmitted PUCCH only includes the HARQ-ACK, information corresponding to the control information, and the scheduling request and the CSI report are dropped.

8. The method of claim 7, wherein the first time duration starts after a predefined threshold from a last symbol in which the control information is received, the predefined threshold depending on a capability of the NCR, and wherein the second time duration is a slot determined based on a slot in which the control information is transmitted and a value configured by the second information.

9. The method of claim 7, further comprising:

transmitting, to the NCR, information on a maximum deferring window which starts from a last symbol in which the control information is received; and transmitting, to the NCR, second control information including information indicating a cancellation and a retransmission of the retransmission indicated by the control information, wherein a third time duration for the cancellation of the retransmission is identified based on the second control information, and wherein, in case that the second time duration overlaps with the third time duration within the maximum deferring window, the retransmitted PUCCH is received.

10. A network controlled repeater (NCR) in a wireless communication system, the NCR comprising:

a transceiver; and a controller coupled with the transceiver and configured to:

receive, from a base station, control information including (i) first information indicating both a cancellation and a retransmission of an uplink transmission of the NCR and (ii) second information associated with a slot for the retransmission of the uplink transmission of the NCR, identify a first time duration for the cancellation of the uplink transmission based on the control information, in response to a physical uplink control channel (PUCCH) of the NCR overlapping with at least one symbol of the first time duration, cancel a transmission of the PUCCH within the first time duration, identify, based on the second information, a second time duration for a retransmission of the PUCCH which is canceled within the first time duration, and perform the retransmission of the PUCCH based on the second time duration, wherein, in case that the PUCCH which is canceled within the first time duration includes hybrid automatic repeat request-acknowledgment (HARQ-ACK) information corresponding to the control information and at least one of a scheduling request or a channel state information (CSI) report, the retransmitted PUCCH only includes the HARQ-ACK information corresponding to the control information, and the scheduling request and the CSI report are dropped.

11. The NCR of claim 10, wherein the controller is further configured to:

identify that a slot in which the retransmission of the PUCCH is to be performed overlaps with a time duration for a cancellation of the retransmission by at least one symbol, identify whether a number of retransmissions of the PUCCH exceeds a maximum number of retransmissions configured by higher layer signaling, and drop the retransmission of the PUCCH in case that the number of retransmissions of the PUCCH exceeds the maximum number of retransmissions.

12. The NCR of claim 10, wherein the first time duration starts after a predefined threshold from a last symbol in which the control information is received, the predefined threshold depending on a capability of the NCR, and wherein the second time duration is a slot determined based on a slot in which the control information is received and a value configured by the control-second information.

13. The NCR of claim 10, wherein the controller is further configured to:

receive, from the base station, information on a maximum deferring window which starts from a last symbol in which the control information is received, receive, from the base station, second control information including information indicating a cancellation and a retransmission of the retransmission indicated by the control information, and identify a third time duration for the cancellation of the retransmission based on the second control information, and wherein, in case that the second time duration overlaps with the third time duration within the maximum deferring window, the retransmission of the PUCCH is performed.

14. The NCR of claim 10, wherein the controller is further configured to receive, from the base station, information on a dedicated time resource for the uplink transmission of the NCR, and wherein the dedicated time resource is configured within flexible symbols for a terminal.

15. The NCR of claim 10, wherein the controller is further configured to receive, from the base station, information on a switching time between an uplink and a downlink, and wherein the uplink transmission of the NCR overlaps with an uplink transmission of a user equipment (UE) communicating with the base station via the NCR.

16. A base station in a wireless communication system, the base station comprising:

a transceiver; and a controller coupled with the transceiver and configured to:

transmit, to a network controlled repeater (NCR), information configuring a first time duration for a cancellation of an uplink transmission of the NCR, transmit, to the NCR, control information including (i) first information indicating both the cancellation and a retransmission of the uplink transmission of the NCR and (ii) second information associated with a slot for the retransmission of the uplink transmission of the NCR, and receive, from the NCR, a physical uplink control channel (PUCCH) that is canceled within the first time duration and retransmitted within a second time duration, the second time duration for a retransmission of the PUCCH being based on the second information, wherein, in response to the PUCCH of the NCR overlapping with at least one symbol of the first time duration, a transmission of the PUCCH is canceled within the first time duration, and wherein, in case that the PUCCH which is canceled within the first time duration includes hybrid automatic repeat request-acknowledgment (HARQ-ACK) information corresponding to the control information and at least one of a scheduling request or a channel state information (CSI) report, the retransmitted PUCCH only includes the HARQ-ACK information corresponding to the control information, and the scheduling request and the CSI report are dropped.

17. The base station of claim 16, wherein the first time duration starts after a predefined threshold from a last symbol in which the control information is received, the predefined threshold depending on a capability of the NCR, and wherein the second time duration is a slot determined based on a slot in which the control information is transmitted and a value configured by the second information.

18. The base station of claim 16, wherein the controller is further configured to:

transmit, to the NCR, information on a maximum deferring window which starts from a last symbol in which the control information is received; and transmit, to the NCR, second control information including information indicating a cancellation and a retransmission of the retransmission indicated by the control information, wherein a third time duration for the cancellation of the retransmission is identified based on the second control information, and wherein, in case that the second time duration overlaps with the third time duration within the maximum deferring window, the retransmitted PUCCH is received.

19. The method of claim 1, wherein the NCR relays communications between the base station and a user equipment (UE) by receiving a downlink signal from the base station, amplifying the downlink signal, and transmitting the downlink signal to the UE.

* * * * *